United States Patent
Bos et al.

(10) Patent No.: US 9,652,200 B2
(45) Date of Patent: May 16, 2017

(54) MODULAR MULTIPLICATION USING LOOK-UP TABLES

(71) Applicant: NXP B.V., Eindhoven (NL)

(72) Inventors: Joppe Bos, Leuven (BE); Michaël Peeters, Leuven (BE)

(73) Assignee: NXP B.V., Eindhoven (NL)

( * ) Notice: Subject to any disclaimer, the term of this patent is extended or adjusted under 35 U.S.C. 154(b) by 161 days.

(21) Appl. No.: 14/624,874

(22) Filed: Feb. 18, 2015

(65) Prior Publication Data

US 2016/0239267 A1 Aug. 18, 2016

(51) Int. Cl.
*G06F 7/38* (2006.01)
*G06F 7/48* (2006.01)
*G06F 7/72* (2006.01)
*H04L 9/00* (2006.01)

(52) U.S. Cl.
CPC ............ *G06F 7/4812* (2013.01); *G06F 7/723* (2013.01); *G06F 7/729* (2013.01); *H04L 9/002* (2013.01); *G06F 2207/7261* (2013.01); *H04L 2209/16* (2013.01)

(58) Field of Classification Search
CPC ........ G06F 7/4812; G06F 7/723; G06F 7/729; H04L 8/002
USPC .................................................. 708/491–492
See application file for complete search history.

(56) References Cited

U.S. PATENT DOCUMENTS

| 6,064,740 A | * | 5/2000 | Curiger ................... G06F 7/723 380/264 |
|---|---|---|---|
| 7,653,196 B2 | | 1/2010 | Koshy |
| 2002/0126838 A1 | | 9/2002 | Shimbo et al. |
| 2014/0019759 A1 | | 1/2014 | Burmester |

OTHER PUBLICATIONS

Bajard, Jean-Claude, et al., "Fault Detection in RNS Montgomery Modular Multiplication", Computer Arithmetic (ARITH), 2013 21st IEEE Symposium on, IEEE, Apr. 7, 2013 (Apr. 7, 2013), pp. 119-126, XP032431077, D01: 10.1109/ARITH.2013.31, ISBN: 978-1-4673-5644-2.
Extended European Search Report dated Jun. 28, 2016 in EP Application No. 15202799.1.
A white-box DES implementation for DRM applications, Digital Rights Management workshop (DRM), 2002, 1-15.
Harvey Garner, "The residue number system, IRE Transactions on Electronic Computers", 1959, 140-147.
Jean-Claude Bajard, et al., "An RNS montgomery modular multiplication algorithm", IEEE Trans. Computers 47, No. 7, 1998, 766-776.

(Continued)

*Primary Examiner* — Tan V. Mai

(57) ABSTRACT

Various embodiments relate to a method, system, and non-transitory machine-readable medium encoded with instructions for execution by a processor for performing modular exponentiation, the non-transitory machine-readable medium including: instructions for iteratively calculating a modular exponentiation, $b^d$ mod n, including: instructions for squaring a working value, c; and instructions for conditionally multiplying the working value, c, by a base value, b, dependent on a bit of an exponent, d, including: instructions for unconditionally multiplying the working value, c, by a lookup table entry associated with the base value.

18 Claims, 11 Drawing Sheets

(56) References Cited

OTHER PUBLICATIONS

Karl C. Posch, et al., "Modulo reduction in residue number systems, IEEE Trans. Parallel Distrib. Syst.", 1995, 449-454.
Matthias Jacob, et al., "Attacking an obfuscated cipher by injecting faults", Digital Rights Management Workshop—DRM 2002, 2003, 16-31.
Mohamed Karroumi, "Protecting white-box AES with dual ciphers, Information Security and Cryptology ICISC 2010", Lecture Notes in Computer Science, vol. 6829, Springer 2010, 2010, 278-291.
Olivier Billet, et al., "Cryptanalysis of a white box AES implementation", Selected Areas in Cryptography (SAC); Lecture notes in computer science, 2004, 227-240.
Peter L. Montgomery, "Modular multiplication without trial division,Mathematics of Computation", No. 170, 1985, 519-521.
R.L. Rivest, et al., "A method for obtaining digital signatures and public-key cryptosytems", Communications of the ACM 21, 1978, 120-126.
Roy D. Merrill, "Improving digital computer performance using residue number theory, Electronic Computers", IEEE Transactions on EC-13, No. 2, 1964, 93-101.
Stanley Chow, et al., "White-box cryptography and an AES implementation", Selected Areas in Cryptography—SAC, 2002, 250-270.
Yaying Xiao, et al., "A secure implementation of white-box AES, Computer Science and its Applications", CSA, 2009, 1-6.
Roy (Roy et al., Progress in Cryptology INDOCRYPT 2009, 10th International Conference on Cryptology in India, Dec. 2009, Springer LNCS 5922.
Schneier (Bruce Schneier, Applied Cryptography, Protocols, Algorithms and Source Code in C, 2nd Edition, 1996 ISBN: 0471117099.
Stallings(William Stallings, Cryptography and Network Security, 2nd Edition, 1998, ISBN: 0138690170; cited in U.S. Appl. No. 14/580,963.

* cited by examiner

500 ↘

| 510 → | $L_j$ | | $d_j = 1$ |
|---|---|---|---|
| 512 → | 0 | 0 | |
| 514 → | 1 | 1 | $L_j(a_j) = a_j$ |
| 516 → | 2 | 2 | |
| 518 → | ... | ... | |

| 520 → | $L_j$ | | $d_j = 0$ |
|---|---|---|---|
| 522 → | 0 | 1 | |
| 524 → | 1 | 1 | $L_j(a_j) = 1$ |
| 526 → | 2 | 1 | |
| 528 → | ... | ... | |

FIG. 5

MODULAR MULTIPLICATION USING LOOK-UP TABLES

TECHNICAL FIELD

Various embodiments disclosed herein relate generally to modular exponentiation and, more particularly but not exclusively, to modular exponentiation for RSA-based digital signature and decryption schemes.

BACKGROUND

Many cryptosystems, such as RSA, utilize modular exponentiation as a step in obscuring data. Specifically, to encrypt data, encoded data, a, is raised to a power of a public exponent, e, and modulo a value N: $c=a^e$ mod N. Decryption is later performed and includes raising the encrypted data to a power of a private exponent, d: $a=c^d$ mod N. Similar modular exponentiation may be used to create digital signatures, with the exception that the use of the private and public exponents is switched: the private exponent, d, is used to initially encipher the data and the public exponent, e, is used to verify the signature later.

Typically, the values chosen for the key 3-tuple <e, d, N> are very large. For example, RSA generally uses a key size of 1,024 to 4,096 bits. With such large values, a naïve algorithm would utilize an inordinate amount of processing time to calculate the modular exponentiations used by a given cryptosystem.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of a preferred embodiment adequate to allow those of ordinary skill in the art to make and use the inventive concepts will follow in later sections.

Various embodiments described herein relate to a non-transitory machine-readable medium encoded with instructions for execution by a processor for performing modular exponentiation, and a related device and method, the non-transitory machine-readable medium including: instructions for iteratively calculating a modular exponentiation, $b^d$ mod n, including: instructions for squaring a working value, c; and instructions for conditionally multiplying the working value, c, by a base value, b, dependent on a bit of an exponent, d, including: instructions for unconditionally multiplying the working value, c, by a lookup table entry associated with the base value.

Various embodiments are described wherein: the working value c, and base value, b, are represented in a residue number system (RNS), and the instructions for unconditionally multiplying the working value, c, by a lookup table entry associated with the base value includes multiplying a plurality of working RNS integers representative of the working value, c, by a plurality of lookup table entries associated with a plurality of base RNS integers representative of the base value, b.

Various embodiments are described wherein the instructions for multiplying a plurality of working RNS integers representative of the working value, c, by a plurality of lookup table entries associated with a plurality of base RNS integers representative of the base value, b, includes: instructions for multiplying a working RNS integer of the plurality of working RNS integers representative of the working value, c, by a lookup table entry associated with a base RNS integer of the plurality of base RNS integers representative of the base value, b, from a lookup table associated with an RNS modulus corresponding to the base RNS integer.

Various embodiments are described wherein: the instructions for iteratively calculating the modular exponentiation include instructions for iterating through a plurality of bit positions of the exponent, d, and the instructions for unconditionally multiplying the working value, c, by a lookup table entry associated with the base value, b, include instructions for utilizing a lookup table associated with a current bit position from a plurality of lookup tables.

Various embodiments are described wherein the instructions for conditionally multiplying the working value, c, by a base value, b, dependent on a bit of an exponent, d, include instructions for performing a Montgomery multiplication, and the instructions for performing a Montgomery multiplication invoke the instructions for unconditionally multiplying the working value, c, by a lookup table entry associated with the base value.

Various embodiments additionally include instructions for receiving, from another device, a set of lookup tables for use by the instructions for unconditionally multiplying the working value, c, by a lookup table entry associated with the base value.

Various embodiments described herein relate to a non-transitory machine-readable medium encoded with instructions for execution by a processor for generating lookup tables for performing modular exponentiation, and a related device and method, the non-transitory machine-readable medium including: instructions for initializing a plurality of lookup tables respectively corresponding to different bit positions within a secret exponent, d; and instructions for generating values for inclusion in the plurality of lookup tables, including: instructions for generating a value for a lookup table according to a first method when the secret exponent, d, carries a first bit value at a bit position associated with the lookup table, and instructions for generating a value for a lookup table according to a second method different from the first method when the secret exponent, d, carries a second bit value different from the first bit value at a bit position associated with the lookup table.

Various embodiments are described wherein the instructions for generating values for inclusion in the plurality of lookup tables include instructions for obfuscating the generated values.

Various embodiments are described wherein the instructions for obfuscating the generated values include: instructions for performing a first mathematical function on a first value for inclusion in a first lookup table; and instructions for performing a second mathematical function on a second value for inclusion in a second lookup table, wherein the second mathematical function is an effective inverse of the first mathematical function.

Various embodiments are described wherein: the first mathematical function incorporates an obfuscating value into the first value, and the second mathematical function incorporates the square of a modular inverse of the obfuscating value into the second value.

Various embodiments are described wherein the obfuscating value includes a constant value that is invariant based on an index where the first value will be stored within the first lookup table.

Various embodiments are described wherein the obfuscating value includes an index where the first value will be stored within the lookup table raised to the power of a constant exponent value.

Various embodiments are described wherein the instructions for obfuscating the generated values include: instructions for performing a first mathematical function on a first value for inclusion in a first lookup table; and instructions for performing a second mathematical function on a second value for inclusion in a second lookup table, wherein the second mathematical function is an effective inverse of the first mathematical function.

Various embodiments are described wherein: the first mathematical function incorporates an obfuscating value into the first value, and the second mathematical function incorporates the square of a modular inverse of the obfuscating value into the second value.

Various embodiments are described wherein the obfuscating value includes a constant value that is invariant based on an index where the first value will be stored within the first lookup table.

Various embodiments are described wherein the obfuscating value includes an index where the first value will be stored within the lookup table raised to the power of a constant exponent value.

Various embodiments are described wherein the first method and the second method share at least one instruction in common.

Various embodiments are described wherein the first method includes a differentiating instruction for incorporating into the value an index where the value will be stored within the lookup; and the second method omits the differentiating instruction.

Various embodiments are described wherein the instructions for initializing a plurality of lookup tables respectively corresponding to different bit positions within a secret exponent, d, include: instructions for determining a set of moduli M to be used in a residue numerical system (RNS); and instructions for initializing, for each modulus $m_i$ in the set of moduli M, a plurality of lookup tables respectively corresponding to different bit positions within a secret exponent, d.

Various embodiments described herein relate to a non-transitory machine-readable medium encoded with instructions for execution by a processor for generating lookup tables for performing modular exponentiation, and a related device and method, the non-transitory machine-readable medium including: instructions for initializing a plurality of lookup tables $L_{i,j}$ respectively corresponding to a plurality of pairings of bit positions of a secret exponent, d, and residue number system (RNS) moduli; instructions for, when the value of the secret exponent, d, at the bit position corresponding to a first lookup table $L_{0,k}$ is 0, setting the values of a first lookup table, $L_{0,k}$ of the plurality of lookup tables as $$L_{0,m_i}(a_i)=(\delta_o * a_i^{e_0}) \bmod m_i$$

where $a_i$ is a potential RNS integer for modulus $m_i$ of the RNS moduli, $\delta_o$ is a first predetermined constant, and $e_0$ is a first predetermined exponent; and instructions for, when the value of the secret exponent, d, at the bit position corresponding to a first lookup table $L_{0,k}$ is 1, setting the values of a first lookup table, $L_{0,mi}$, of the plurality of lookup tables as $$L_{0,m_i}(a_i)=(\delta_o * a_i^{e_o} * a_i) \bmod m_i.$$

Various embodiments additionally include instructions for, when the value of the secret exponent, d, at the bit position corresponding to a last lookup table $L_{k-1,mi}$ is 0, setting the values of a first lookup table, $L_{k-1,mi}$, of the plurality of lookup tables as $$L_{k-1,m_i}(a_i)=((\delta_{k-2}^{-2} \bmod N)*(a_i^{-1})^{2e_{k-2}}) \bmod m_i$$

where $a_i$ is a potential RNS integer for modulus $m_i$ of the RNS moduli, $\delta_{k-2}$ is a last predetermined constant, $e_{k-2}$ is a last predetermined exponent, and N is a modulus for modular exponentiation; and instructions for, when the value of the secret exponent, d, at the bit position corresponding to a last lookup table $L_{k-1,mi}$ is 0, setting the values of a first lookup table, $L_{k-1,mi}$, of the plurality of lookup tables as $$L_{k-1,m_i}(a_i)=((\delta_{k-2}^{-2} \bmod N)*(a_i^{-1})^{2e_{k-2}} * a_i) \bmod m_i.$$

Various embodiments are described instructions for, when the value of the secret exponent, d, at the bit position corresponding to a middle lookup table $L_{j,mi}$ is 0, setting the values of a first lookup table, $L_{j,mi}$, of the plurality of lookup tables as $$L_{j,m_i}(a_i)=((\delta_{j-1}^{-2} * \delta_j \bmod N)*(a_i^{-1})^{2e_{j-1}} * a_i^{e_j}) \bmod m_i$$

where $a_i$ is a potential RNS integer for modulus $m_i$ of the RNS moduli $m_i$, $\delta_{j-1}$ is a previous predetermined constant with respect to the middle lookup table, $\delta_j$ is a current predetermined constant for the middle lookup table, $e_{j-1}$ is a previous predetermined exponent with respect to the middle lookup table, $e_j$ is a current predetermined exponent for the middle lookup table, and N is a modulus for modular exponentiation; and instructions for, when the value of the secret exponent, d, at the bit position corresponding to a middle lookup table $L_{j,mi}$ is 1, setting the values of a first lookup table, $L_{j,mi}$, of the plurality of lookup tables as $$L_{j,m_i}(a_i)= ((\delta_{j-1}^{-2} * \delta_j \bmod N)*(a_i^{-1})^{2e_{j-1}} * a_i^{e_j} * a_i) \bmod m_i.$$

Various embodiments described herein relate to a system for providing white box modular exponentiation including: a first device including a first processor and the non-transitory machine-readable medium encoded with instructions for execution by a processor for performing modular exponentiation as described above; and a second device including a second processor and one of the non-transitory machine-readable media encoded with instructions for execution by a processor for generating lookup tables for performing modular exponentiation of described above, wherein the second device generates a plurality of lookup tables for use by the first device for performing modular exponentiation without access to the secret exponent, d.

BRIEF DESCRIPTION OF THE DRAWINGS

In order to better understand various embodiments, reference is made to the accompanying drawings, wherein:

FIG. 5 illustrates a first example of a set of lookup tables for performing conditional multiplication;

To facilitate understanding, identical reference numerals have been used to designate elements having substantially the same or similar structure or substantially the same or similar function.

DETAILED DESCRIPTION

Figure 1:
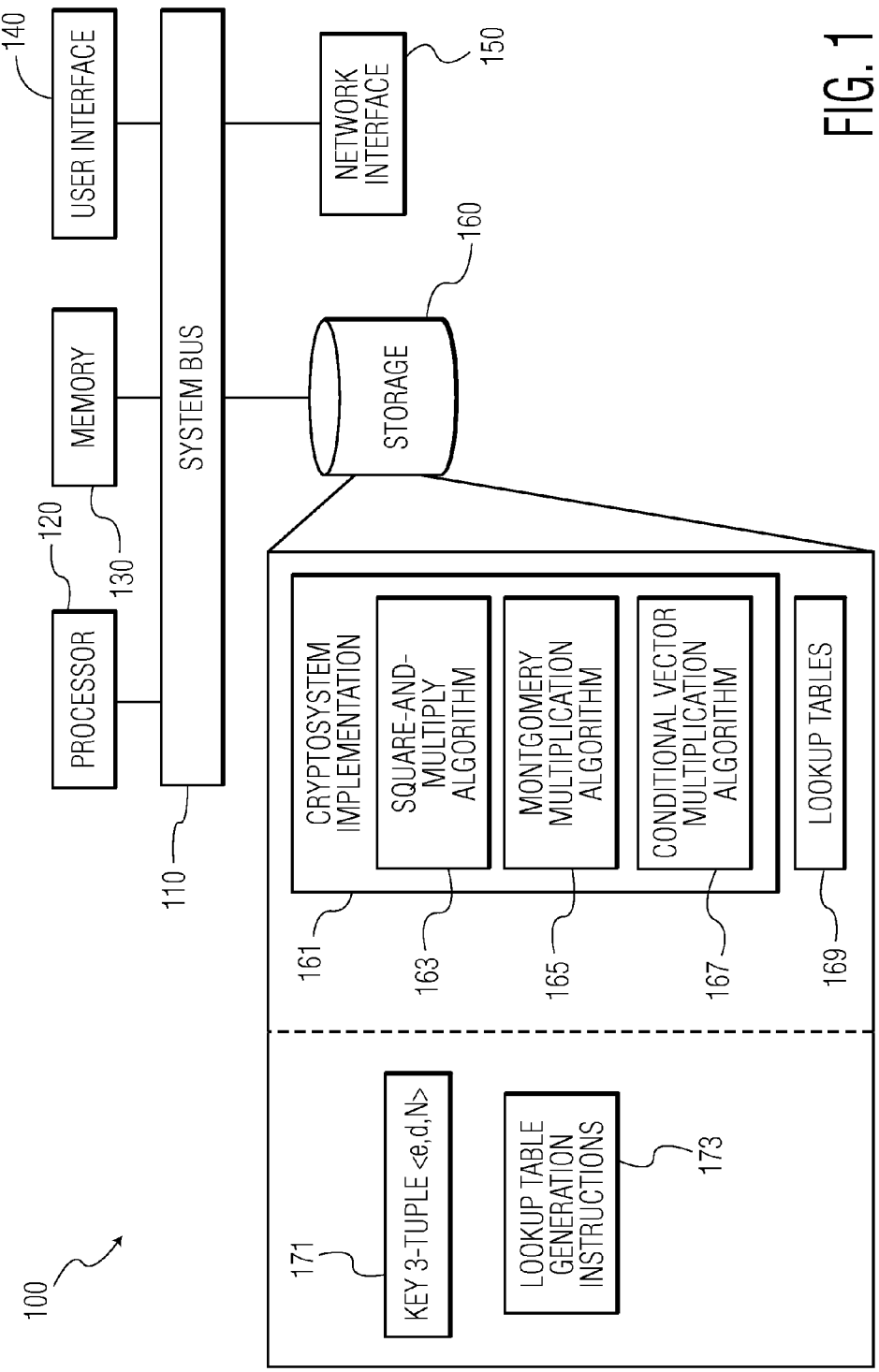
FIG. 1 illustrates an example of a hardware system 100 for implementing the modular exponentiation schemes described herein.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

In view of the exceedingly large values potentially involved in computing modular exponentiations in the context of cryptosystems, it is desirable to implement algorithms for efficiently performing such functions. Various methods described herein utilize a square-and-multiply approach operating on residue number system (RNS) representations of the values and Montgomery multiplication to operate on smaller values than the original base and exponents, thereby providing an algorithm that is less computationally expensive than a naïve algorithm.

In view of the growing contexts and applications for encryption, such as applications on untrusted platforms, recent efforts have been devoted to the concept of "white box cryptography," wherein cryptographic schemes are developed to be secure even when the cryptographic implementation is laid open to an attacker. White-box cryptography is concerned with the design and analysis of software implementations of cryptographic algorithms engineered to execute on untrusted platforms. Particularly, this is the scenario where the user of a particular device can decrypt messages (with a secret key) which are encrypted with his public key but is unable to extract or derive sufficient information to recover this secret key. Furthermore, it is assumed in such implementations that the user can be the attacker: e.g. the attacker has full access to the software implementation, can pause, alter and resume the execution of the software implementation at any time.

For example, in digital rights management systems, it is desirable to provide a content-consumer with the ability to easily authenticate themselves as a party that is entitled to access the content. It is also desirable, however, to prevent that content-consumer from sharing credentials with other parties for the purpose of provided those other parties with access to the same content that is only licensed to that original content-consumer.

One white-box approach to this scenario is to provide the content-consumer with the ability to digitally sign messages using a private key, d, assigned to the content-consumer without actually giving the private key, d, to the content-consumer. To that end, the content-consumer may be provided, instead, with a lookup table of pre-computed values based on the private key, d, that may be used in computing the modular exponentiation. In various systems, for example, the look-up table may be provided to the content-consumer by, for example, a central digital rights management server for use in authenticating the content-consumer to one or more media servers serving the protected content. The content-consumer may then use this lookup table to compute digital signatures in spite of not knowing the value of their private key, d. Various embodiments described herein enable a white box implementation of an efficient modular exponentiation scheme by providing lookup tables that enable the device to calculate a modular exponentiation using a secret exponent, d, without actually knowing that exponent.

It will be appreciated that, while various examples described herein are explained in the context of digital signature schemes, various aspects described herein may be adapted to data encryption schemes wherein data is encrypted with a public key and retrieved using a private key.

FIG. 1 illustrates an example of a hardware system 100 for implementing the modular exponentiation schemes described herein. The hardware system 100 may correspond to virtually any device that may participate in a cryptosystem scheme such as, for example, a personal computer, laptop, tablet, mobile communications device, server, blade, smart card, near field communication (NFC) device, or other device. For example, the hardware system may correspond to a set-top box for receiving and rendering digital content or a server for providing digital content. Various applications of the method described herein will be apparent such as, for example, digital rights management (DRM), banking applications, and generally protecting cryptographic keys in devices such as mobile phones and television set-top boxes.

As shown, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in the memory 130 or the storage 150. As such, the processor may include a microprocessor, field programmable gate array (FPGA), application-specific integrated circuit (ASIC), or other similar devices.

The memory 130 may include various memories such as, for example L1, L2, or L3 cache or system memory. As such, the memory 130 may include static random access memory (SRAM), dynamic RAM (DRAM), flash memory, read only memory (ROM), or other similar memory devices.

The user interface 140 may include one or more devices for enabling communication with a user such as an administrator. For example, the user interface 140 may include a display, a mouse, and a keyboard for receiving user commands. In some embodiments, the user interface 140 may include a command line interface or graphical user interface that may be presented to a remote terminal via the network interface 150.

The network interface 150 may include one or more devices for enabling communication with other hardware devices. For example, the network interface 150 may include a network interface card (NIC) configured to communicate according to the Ethernet protocol. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate.

For example, where the hardware device 100 is configured to decrypt data or digitally sign messages in accordance with the whitebox cryptosystems described herein, the storage 160 includes a cryptosystem implementation 161 for directing such operations. As explained above, the whitebox cryptosystem 161 may utilize one or more modular exponentiation steps and, as such, the cryptosystem implementation may include a square-and-multiply algorithm 163 for performing such a modular exponentiation. Additionally, to provide for more efficient calculations, the square-and-multiply algorithm 163 may utilize a Montgomery multiplication algorithm 165. Further, as will be explained in greater detail below, the Montgomery multiplication algorithm 165 may utilize a conditional vector multiplication algorithm 167 to perform a conditional operation for the square-and-multiply algorithm. Specifically, a square-and-multiply algorithm calculates $b^d$ mod n in part by performing a multiplication step depending on the value of the secret exponent d; however, in a white box cryptosystem implementation, the value of the secret exponent, d, is not provided to the system. Instead, various embodiments described herein include a conditional vector multiplication algorithm 167 that is unconditionally executed by the Montgomery multiplication algorithm 167 and utilizes lookup tables 169 that are precomputed by another device based on the secret exponent, d, to provide the effect of the conditional that has been "removed" from the square-and-multiply algorithm. For example, as will be described below, the conditional vector multiplication algorithm 167 may be an RNS multiplication algorithm which may utilize pre-computed lookup tables for at least some terms to introduce a conditional effect.

Where the hardware device 100 is a device that provides lookup tables to other devices that include white-box cryptosystem implementations, the storage 160 includes a key 3-tuple 171 including the public exponent, e; private exponent, d; and key modulus, N, for use in creating lookup tables. The storage 170 also includes lookup table generation instructions 173 for creating lookup tables to be used by other devices.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the hardware device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. In other embodiments, such as those embodiments wherein the device 100 is implemented in a cloud computing environment, the various components may be physically located in diverse machines. For example, the processor 120 may include a first microprocessor in a first data center server and a second microprocessor in a second data center server. Various additional arrangements will be apparent.

Figure 2:
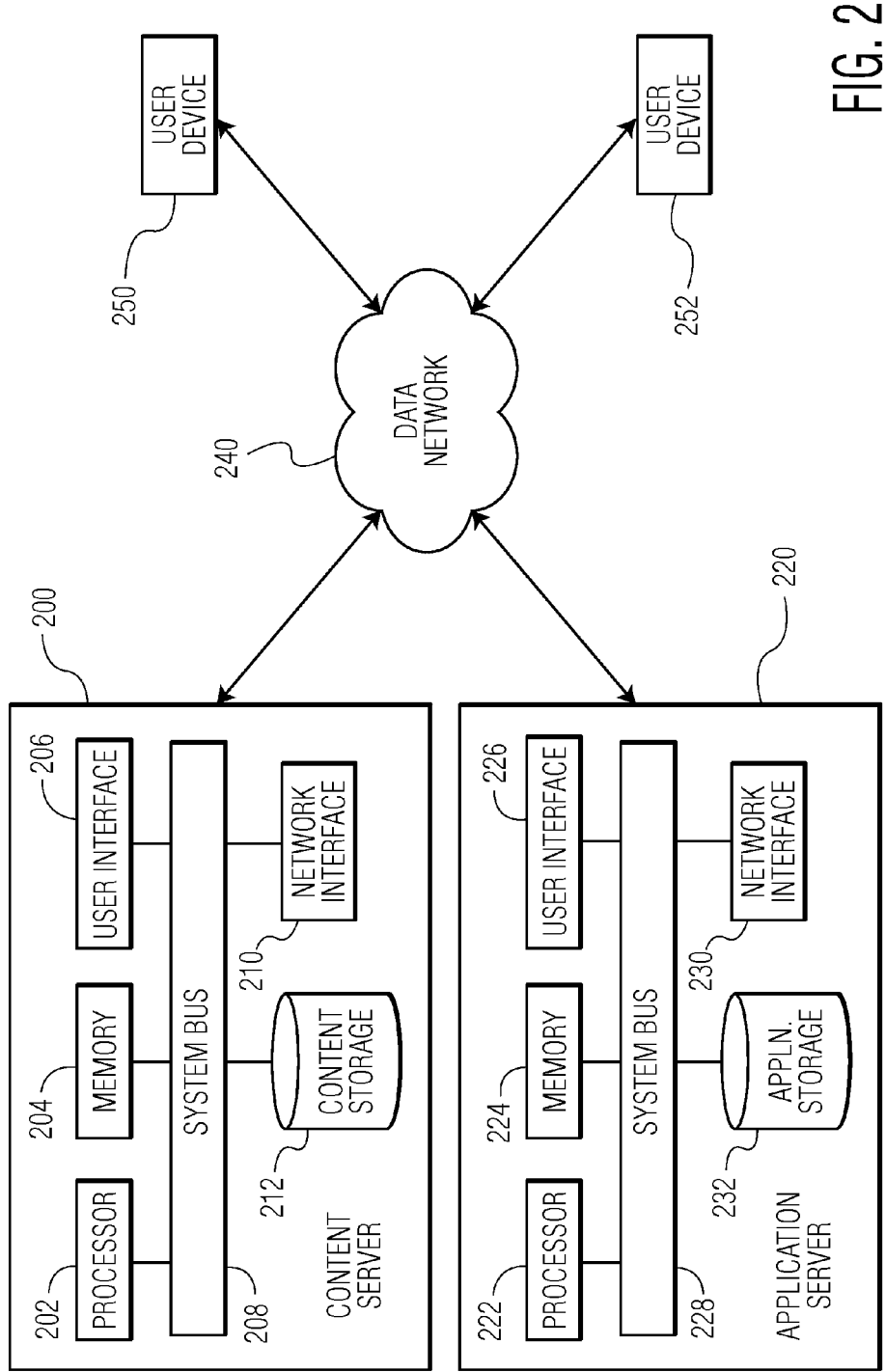
FIG. 2 illustrates an example of a system for providing a user device secure content and a software application that processes the secure content.

FIG. 2 illustrates an example of a system for providing a user device secure content and a software application that processes the secure content. The system includes a content server 200, application server 220, user devices 250, 252, and a data network 240. The user devices 250, 252 may request access to secure content provided by the content server 200 via data network 240. The data network 240 can be any data network providing connectivity between the user devices 250, 252 and the content server 200 and application server 220. The user devices 250, 252 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 200. The software application may be downloaded from the application server 220. The software application may be obscured using the techniques described above as well as operate as described above. Once the user devices 250, 252 install the software application, the user device may then download secure content from the content server 200 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 200 may control the access to the secure content provided to the user devices 250, 252. As a result when the content server 200 receives a request for secure content, the content server 200 may transmit the secure content to the requesting user device. Likewise, the application server 220 may control access to the software application provided to the user devices 250, 252. As a result when the content server 220 receives a request for the software application, the application server 220 may transmit the software application to the requesting user device. A user device requesting the software application or secure content may also be authenticated by the respective servers, before providing the software application or secure content to the user device.

The content server 200 may include a processor 202, memory 204, user interface 206, network interface 210, and content storage 212 interconnected via one or more system buses 708. It will be understood that FIG. 2 constitutes, in some respects, an abstraction and that the actual organization of the components of the device 200 may be more complex than illustrated.

The processor 202 may be any hardware device capable of executing instructions stored in memory 204 or storage 212. As such, the processor may include a microprocessor, field programmable gate array (FPGA), application-specific integrated circuit (ASIC), or other similar devices.

The memory 204 may include various memories such as, for example L1, L2, or L3 cache or system memory. As such, the memory 204 may include static random access memory (SRAM), dynamic RAM (DRAM), flash memory, read only memory (ROM), or other similar memory devices.

The user interface 206 may include one or more devices for enabling communication with a user such as an administrator. For example, the user interface 206 may include a display, a mouse, and a keyboard for receiving user commands.

The network interface 210 may include one or more devices for enabling communication with other hardware devices. For example, the network interface 210 may include a network interface card (NIC) configured to communicate according to the Ethernet protocol. Additionally, the network interface 210 may implement a TCP/IP stack for communication according to the TCP/IP protocols. Various alternative or additional hardware or configurations for the network interface 210 will be apparent.

The content storage 212 may include one or more machine-readable content storage media such as read-only memory (ROM), random-access memory (RAM), magnetic disk storage media, optical storage media, flash-memory devices, or similar storage media. In various embodiments, the content storage 212 may store content to be provided to users.

The application server 220 includes elements like those in the content server 200 and the description of the like elements in the content server 200 apply to the application server 220. Also, the content storage 212 is replaced by application storage 232. Further, it is noted that the content server and applications server may be implemented on a single server. Also, such servers may be implemented on distributed computer systems as well as on cloud computer systems.

In various embodiments, the application server 220 may have a private key exponent for each of the user devices 250, 252 and, using these values, generate sets of lookup tables to be transmitted to the user devices 250, 252. Thereafter, the user devices 250, 252 may utilize the lookup tables to decrypt content received from the content server or to digitally sign messages to be transmitted to the content server (and thereby authenticate the respective user devices 250, 252). Various other applications for the methods and systems described herein will be apparent.

As will be understood, the modular exponentiation, encoding, or digital signature methods described herein may be deployed and utilized within the system of FIG. 2 or similar systems in various manners. For example, the user devices 250, 252 may be provided by a manufacturer or other seller preconfigured to transmit signed messages to the content server 200 to request the provision of content. Alternatively, the user devices 250, 252 may not be fully preconfigured for such operation; instead, the application server 220 may communicate with the user devices 250, 252 to effect such configuration. For example, the application server may transmit code instructions for implementing the methods described herein or data defining one or more lookup tables.

Figure 3:
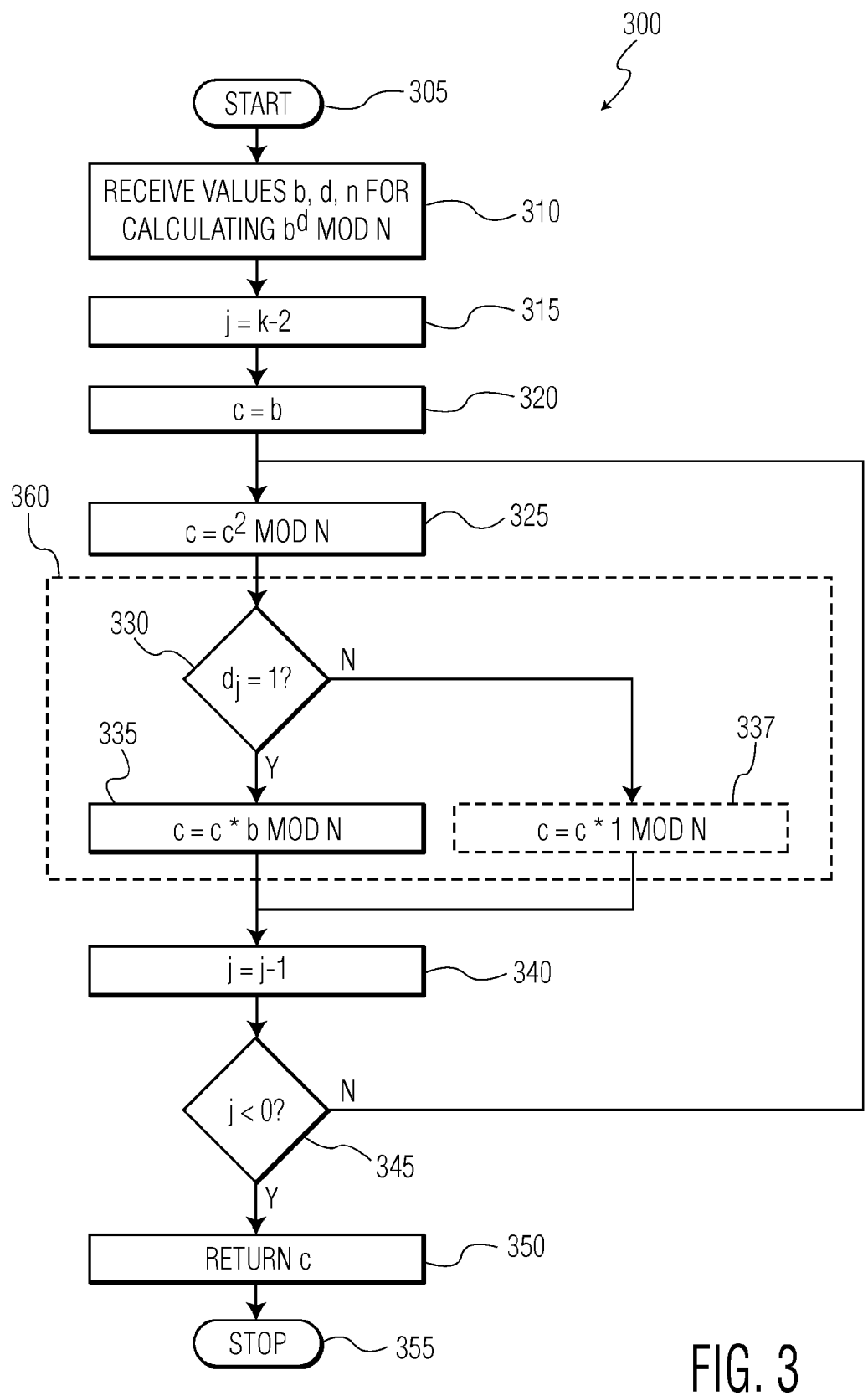
FIG. 3 illustrates an example of a method for computing a modular exponentiation.

FIG. 3 illustrates an example of a method 300 for computing a modular exponentiation. The method 300 may be performed by a processor such as, for example, processor 120 of FIG. 1 executing the square-and-multiply algorithm 163. As will be understood, the method 300 may accomplish the calculation $$b^d \bmod n$$

for use in, for example, a cryptosystem used for encryption or digital signatures.

The method 300 begins in step 305 and proceeds to step 310 where the processor receives the values b, d, and n for use in calculating the modular exponentiation. As will be described in greater detail below, various modifications described herein enable operation of the method 300 where the processor does not receive the value of the secret exponent, d, in step 310 or otherwise. Instead, the processor may be provided with, or otherwise have access to, the number of bits that would be carried by the secret exponent, d. The processor then begins iterating through the bits of the secret exponent, d, by, in step 315, initializing an index variable j, to a value of 2 less than the length of the secret exponent, d, in bits. The processor also initializes a working value, c, equivalent to the base value b in step 320.

In step 325, the processor performs the "squaring" step by squaring the current value of c and modulating the result to the modulus N. As can be seen from the flowchart, this step 325 is performed on each iteration and may be considered an "unconditional" step. Next, the processor begins the "multiply" step of the method 300 by determining whether the j bit of the secret key is set to a value of "1." If so, the processor multiplies the current working value by the base value, modulo N, in step 335. If, on the other hand, the $j^{th}$ bit of the secret key is set to a value of "0," the processor performs proceeds to step 340 without changing the working value (or, equivalently, multiplies the working value by 1 in step 337). As can be seen, the "multiply" step is only performed when the corresponding secret key bit is set to "1" and may be considered a "conditional" step. In other words, the processor conditionally multiplies the working value by the base value.

After performing the unconditional square and conditional multiply steps, the processor decrements the index value j in step 340 and determines whether additional secret exponent bits remain to be processed in step 345. If j is not less than zero (i.e., additional bits in d remain), the method 300 loops back to step 325. Otherwise, the computation is complete, the processor returns the final value of c as a result in step 350, and the method 300 proceeds to end in step 355.

In various embodiments, as will be explained in greater detail below, steps 330, 335, and 337 are replaced by a single multiplication step 360 that is performed unconditionally. Specifically, in white-box implementations where the processor does not have access to the secret exponent, d, the processor is unable to perform the step 330 per se. Instead, various embodiments described herein multiply the working value, c, by a value retrieved from a lookup table, precomputed by another device based on the values of d. The processor is provided with at least one lookup table for each bit of the secret exponent, d, from position 0 to k−2. The lookup tables will provide a value that is effectively b when the secret exponent, d, had a value of 1 at the bit corresponding to the lookup table (thus corresponding to step 335); likewise, the lookup tables will provide a value that is effectively 1 when the secret exponent, d, had a value of 0 at the bit corresponding to the lookup table (thus corresponding to step 337).

According to various embodiments, the values b and c may be represented in a residue number system (RNS). According to RNS, an integer is represented as a number of different residues modulo smaller (co-prime) integers. Consider an RNS basis $\mathcal{B}_N = \{m_1, m_2, \ldots m_n\}$ where the greatest common divisor is 1 for any two moduli m. The RNS modulus is denoted $M = \prod_{i=1}^{n} m_i$. An integer $x \in \mathbb{Z}/M\mathbb{Z}$ is represented in the RNS basis $\mathcal{B}_N$ by the vector $\vec{x} = \{x_1, x_2, \ldots x_n\}$ where $$x_i = x \bmod m_i, \text{ for } 1 \le i \le n$$

Computing the integer x represented by $\vec{x}$ can be done by applying the Chinese remainder theorem $$x = \left( \sum_{i=1}^{n} x_i \left( \left( \frac{M}{m_i} \right)^{-1} \bmod m_i \right) \frac{M}{m_i} \right) \bmod M$$

For multiplying values expressed in an RNS, Montgomery multiplication may be used to compute $a*b*R^{-1} \bmod N$ for a Montgomery radix-R by adding an appropriate multiple of the modulus N to the product such that it becomes divisible by R. This is achieved by computing $$a*b*R^{-1} \bmod N \equiv \frac{(a*b) + N*((a*b)(-N^{-1} \bmod R) \bmod R)}{R}$$

The value $(-N^{-1} \bmod R)$ may be pre-computed to further optimize the execution of the Montgomery multiplication at runtime. It will be noted that the right side computes the Montgomery multiplication modulo N without actually reducing any values modulo N. As such, Montgomery multiplication is suitable in the RNS setting.

Implementations of Montgomery multiplication perform computations modulo R. It is often desirable to set the Montgomery radix R equal to the RNS modulus M. In such a configuration, the division by R=M is not possible when representing numbers in an RNS basis with modulus M (because M is not invertible in $\mathbb{Z}/M\mathbb{Z}$). This can be circumvented by introducing an auxiliary basis $\mathcal{B}'_N = \{m'_1, m'_2, \ldots m'_N\}$ with auxiliary RNS modulus $M' = \prod_{i=1}^{n} m'_i$ such that gcd (M', M)=gcd (M', N)=gcd (M, N)=1 and 4N<M<M'. The Montgomery multiplication may then convert from $\mathcal{B}_N$ to $\mathcal{B}'_N$ for those steps where division by R is performed.

Figure 4:
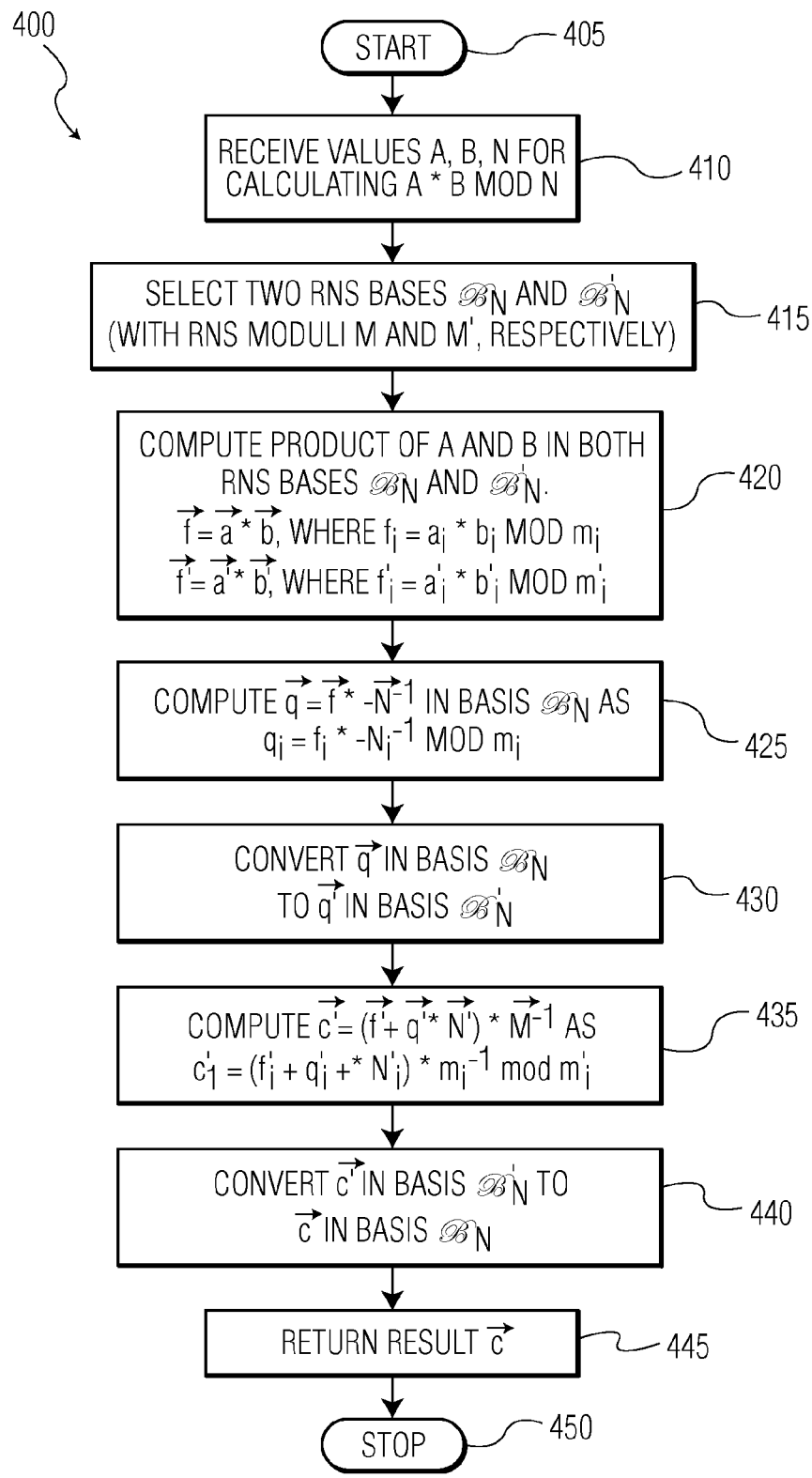
FIG. 4 illustrates an example of a method for computing a product of two numbers in a residue number system (RNS)

FIG. 4 illustrates an example of a method 400 for computing a product of two numbers in a residue number system (RNS). The method 400 may be performed by a processor such as, for example, processor 120 executing the Montgomery multiplication algorithm 165. In various embodiments, the method 400 may be invoked for performing the calculations in steps 325, 335, 337, or 360 of method 300.

The method begins in step 405 and proceeds to step 410 where the processor receives values A, B, and N for computing A*B mod N. For example, where the processor invokes method 400 for step 325 of method 300, A and B may both be the working value, c, from that method 300. As another example, where the processor invokes method 400 for step 335 of method 300, A may be the working value, c, and B may be the base value, b, from that method 300. Where a single unconditional step is used for the multiply step 360, A may be the working value, c, and B may be the result of a lookup table access (and therefore may be effectively the base value, b, or 1, depending on the corresponding bit of the secret exponent, d, when the lookup table was initially computed).

In step 415, the processor selects two RNS bases $\mathcal{B}_N$ to $\mathcal{B}'_N$ for use in representing the values A, B, and intermediate values. In some embodiments, one or both of the RNS bases $\mathcal{B}_N$ to $\mathcal{B}'_N$ may be hard-coded into the algorithm or otherwise preselected. In some embodiments, the values A and B may be received in RNS form already, according to the first RNS basis $\mathcal{B}_N$.

In steps 420, the processor begins performing the non-division-oriented aspect of the Montgomery multiplication formula by computing the products in both RNS bases:

$$\vec{f} = \vec{a} * \vec{b} \text{ where } f_i = a_i * b_i \bmod m_i$$

$$\vec{f'} = \vec{a'} * \vec{b'} \text{ where } f'_i = a'_i * b'_i \bmod m'_i$$

for $1 \le i \le n$. Then, in step 425, the processor computes $\vec{q} = \vec{f} * -\vec{N}^{-1}$ in basis $\mathcal{B}_N$ as $q_i = f_i * -N^{-1} \bmod m_i$. As will be understood, the term $-\vec{N}^{-1}$ is the vector that represents $(-N^{-1} \bmod R)$.

Next, before performing the division-oriented aspects of the Montgomery multiplication formula, the processor converts $\vec{q}$ (represented in basis $\mathcal{B}_N$) to $\vec{q'}$ (represented in basis $\mathcal{B}'_N$). The processor may do this according to any method such as, for example, converting $\vec{q}$ to a non-RNS integer using the Chinese remainder theorem and subsequently converting this integer to an RNS set in basis $\mathcal{B}'_N$ by computing the modulus of the integer by each modulus $m'_i$ in the basis $\mathcal{B}'_N$.

In step 435, the processor performs the remaining computations in the Montgomery multiplication formula by computing $$\vec{c'} = (\vec{f'} + \vec{q'} * \vec{N'}) * M^{-1} \text{ as } c'_i = (f'_i + q'_i * N'_i) * m_i^{-1} \bmod m'_i$$

The result, $\vec{c'}$ is congruent to A*B mod N as represented in basis $\mathcal{B}_N$. The processor converts the result $\vec{c'}$ in step 440 back to the original basis $\mathcal{B}_N$ by, for example, applying the Chinese remainder theorem and performing the multiple modulus operations associated with basis $\mathcal{B}_N$. The processor may then return the result $\vec{c}$ (or, return the non-RNS result c) in step 445 and proceed to step 450.

In various embodiments (such as those wherein $0 \le A$, $B \le 2N$, and 4N<M<M') the output is bounded by 2N and can be reused by subsequent calls of the Montgomery multiplication algorithm 400.

As noted above, systems and methods described herein incorporate the conditional functionality of checking a bit of a secret exponent into an unconditional multiplication statement by referring to values in a precomputed set of lookup tables. Referring back to FIG. 3, in a simple case, the lookup table will return a base value, b, when the corresponding secret exponent, d, bit was "1" (step 335) and will return a value "1" when the corresponding secret exponent, d, bit was "1" (step 337). As such, the working value c may be unconditionally multiplied by the result of the table lookup.

Figure 5:
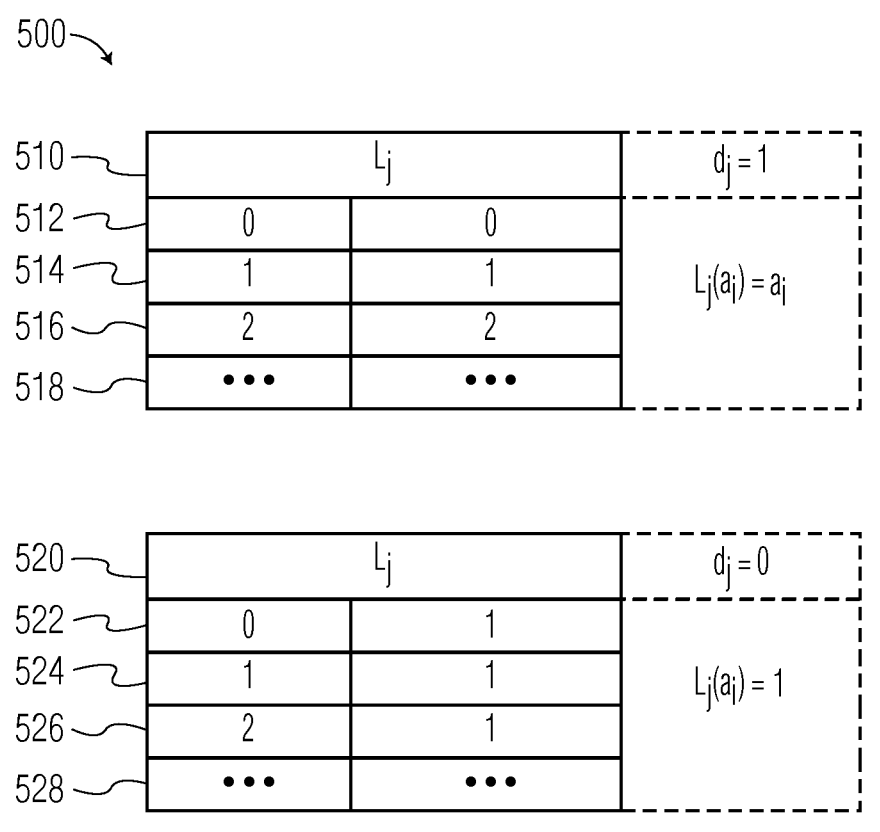

FIG. 5 illustrates a first example of a set of lookup tables 500 for performing conditional multiplication. The lookup tables 500 each include an entry for each RNS residue possible for the value b (because, in various embodiments, c will be multiplied by b or 1 by multiplying their corresponding RNS residues). In some embodiments, such as those alternatives which will be described below, different lookup tables will be provided for each RNS modulus (because the number of entries and potentially the corresponding values will differ for each different modulus). For the sake of simplicity of the initial example of FIG. 5, it will be assumed that the tables 500 include entries for each possible reside of the largest modulus in the basis $\mathscr{B}_N$.

A first table 510 indicates that, where the $j^{th}$ bit of the secret exponent, d, is set to "1," then the value will be the same as the index value, j. In other words, $L_j(a_i)=a_i \bmod m_i$. As such, a first record 512 indicates a value of "0" for an index of "0," a second record 514 indicates a value of "1" for an index of "1," and a first record 516 indicates a value of "2" for an index of "2." The table 510 may include additional entries 518 or fewer entries (e.g., where the corresponding RNS modulus is 2).

A second table 520 indicates that, where the $j^{th}$ bit of the secret exponent, d, is set to "1," then the value of every entry will be 1, regardless of the index. In other words, $L_j(a_i)=1$. As such, the entries 522, 524, 526 all indicate a value of 1. The table 510 may include additional entries 518 or fewer entries (e.g., where the corresponding RNS modulus is 2).

In various embodiments, a white-box cryptosystem implementation would be provided with a set of tables conforming to the examples provided in FIG. 5. By unconditionally multiplying the residues for the working value c by the lookup table values corresponding to the residues of the base value b, the functionality of steps 330, 335, 337 is achieved without knowing the actual value of the secret exponent, d.

Figure 6:
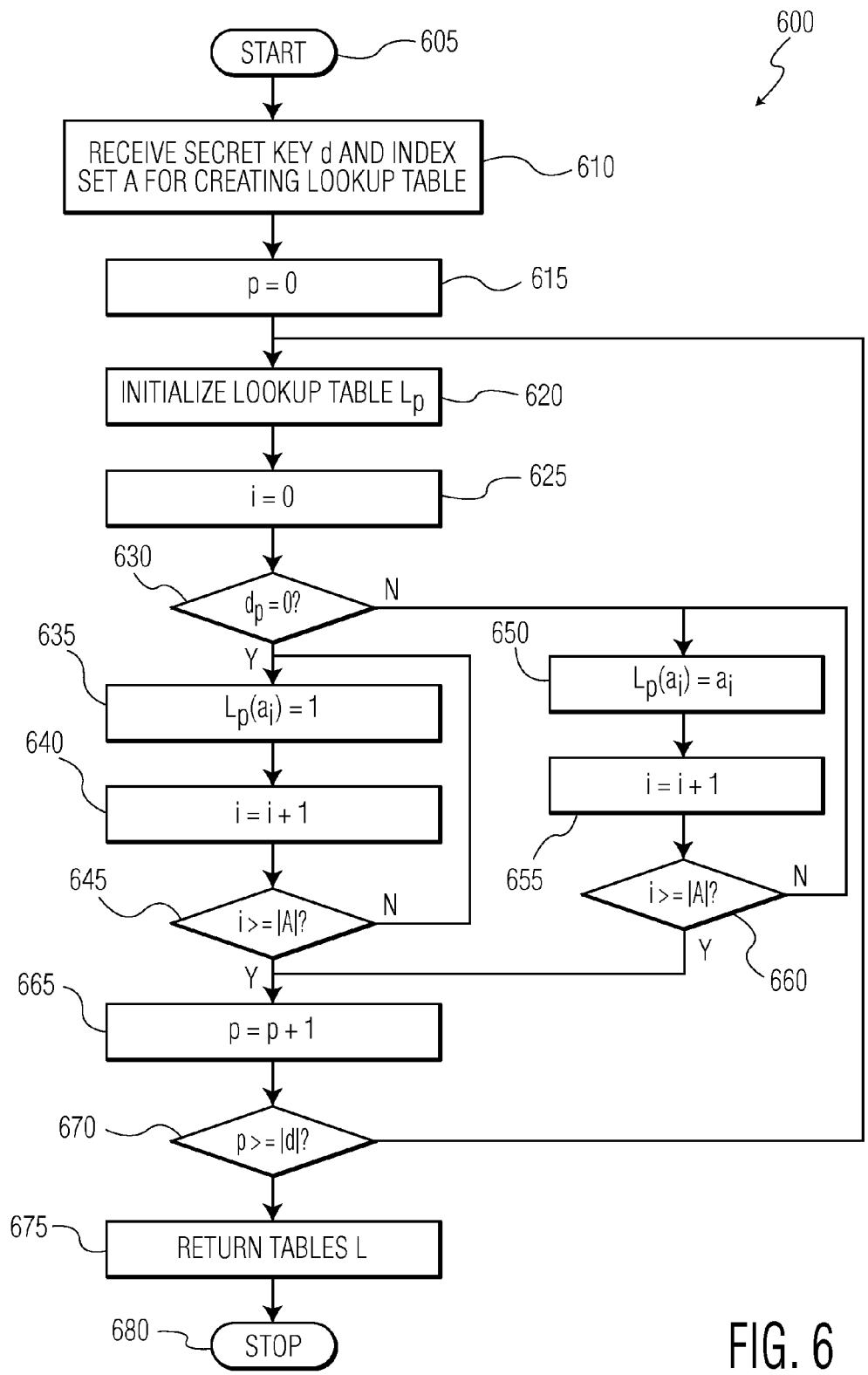
FIG. 6 illustrates an example of a method for generating the first example of a set of lookup tables.

For a white-box cryptosystem implementation to make use of the tables 500, another device first computes the tables to be provided to the white-box implementation. FIG. 6 illustrates an example of a method 600 for generating the first example of a set of lookup tables. The method 600 may be performed by a processor such as, for example, processor 120 executing lookup table generation instructions 173.

The method begins in step 605 and proceeds to step 610 where the processor receives a secret key, d, and set of potential indices A. For example, the set of indices may include each integer value a such that $0 \le i \le m$ where m is an RNS modulus such as the maximum RNS modulus for a basis $\mathscr{B}_N$ or a specific modulus from the basis with $\mathscr{B}_N$ which the set of lookup tables will be associated.

The method 600 proceeds to step 615 where the processor initializes a lookup table index, p, to 0 and then to step 620 where the processor initializes a new lookup table, $L_p$, to correspond to the $p^{th}$ bit of the secret exponent, d. For example, the processor may create an entry for each index in A and initialize the value to 1, 0, null, or some other value appropriate for the specifics of the implementation. The processor also initializes another index i to 0 for iterating through the set of indices, A, in step 625.

In step 630, the processor determines whether the $p^{th}$ bit of the secret exponent d is equal to 0. If so, the processor proceeds to loop through steps 635, 640, 645, setting each entry in the lookup table $L_p$ equal to 1. Otherwise, the processor loops through steps 650, 655, 660, setting each entry of the lookup table $L_p$ equal to the index of that entry (i.e., $L_p(a_i)=a_i$). After filling a value for each entry in the lookup table, the processor increments p in step 665 and then determines whether additional lookup tables remain to be created by determining whether p is now equal to or exceeds the bit length of the secret exponent, d, in step 670. It will be noted that, in the method 300, the $k-1^{th}$ bit is not considered. As such, in various embodiments, step 670 may instead determined whether p is greater than or equal to the length of d minus 1.

If additional lookup tables remain to be created, the method 600 loops back to step 620 Otherwise, the processor returns the tables L, for example, by storing them locally for later use or by transmitting the tables to a white-box cryptosystem implementation. The method 600 then proceeds to end in step 680.

Figure 7:
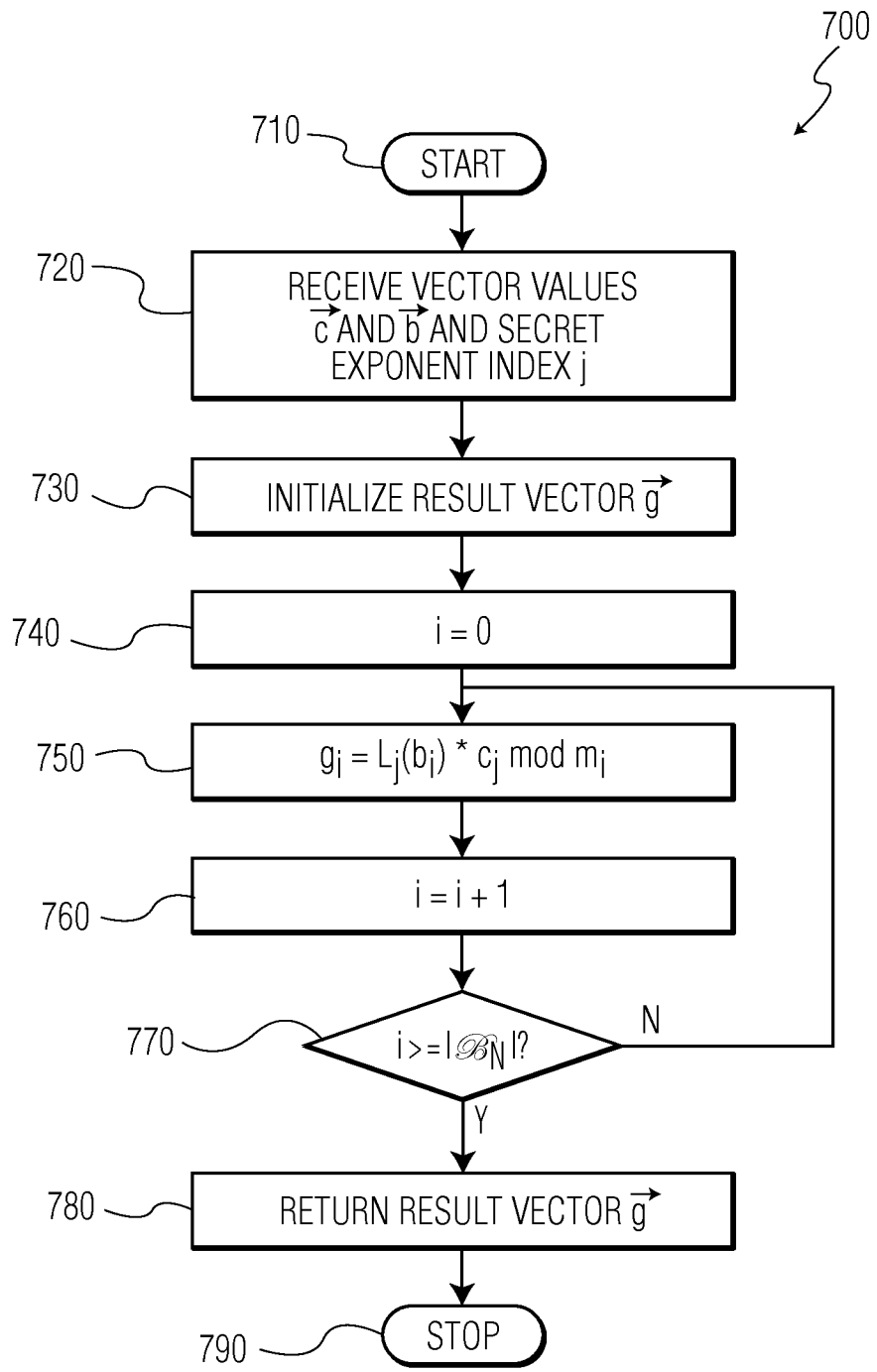
FIG. 7 illustrates an example of a method for performing conditional multiplication using lookup tables.

FIG. 7 illustrates an example of a method 700 for performing conditional multiplication using lookup tables. The method 700 may be performed by a processor such as, for example, processor 120 executing the conditional vector multiplication algorithm 167. The method 700 may be invoked for example by step 420 of the Montgomery multiplication method 400, when that method 400 has been invoked to compute the "multiply" step 360 of the square-and-multiply method 300.

The method 700 begins in step 710 and proceeds to step 720 where the processor receives the RNS vector values $\vec{c}$ and $\vec{b}$ (corresponding to $\vec{a}$ and $\vec{b}$ or $\vec{a'}$ and $\vec{b'}$ in method 400; or c and b in method 300) and the current index into to secret exponent (corresponding to index j in method 300). The processor also initializes a result vector $\vec{g}$ in step 730 by, for example, creating a vector of the same length as $\vec{c}$ and $\vec{b}$ with values initialized to 0, 1, null, or another appropriate value. In step 740, the processor initializes a modulus index, i, to a value of 0.

The processor then begins to compute residue values for the result vector $\vec{g}$ by, in step 750, computing $g_i = L_j(b^i) * c_i \bmod m_i$. In step 760, the processor increments the modulus index and determines, in step 770, whether the index is now greater than the largest index into the basis set $\mathscr{B}_N$. If not, the method loops back to step 750. Otherwise, the processor returns the result vector $\vec{g}$ in step 780 and the method 700 proceeds to end in step 790.

It will be apparent in view of the foregoing that the embodiments described herein thus enable the conditional computation of c*b dependent on the value of d without access to the value of d by unconditionally multiplying c by the value of a lookup table that has been precomputed based on d. For example, where a processor executes step 750 of method 700 for an index j such that $d_j=0$, the lookup table $L_j$ will have been precomputed to resemble table 520. As such, $L_j(b_i)$ will return 1, and step 750 will effectively compute 1*c mod m (thus corresponding to step 337 of method 300). Likewise, where a processor executes step 750 of method 700 for an index j such that $d_j=1$, the lookup table $L_j$ will have been precomputed to resemble table 510. As such, $L_j(b_i)$ will return $b_i$, and step 750 will effectively compute b*c mod m (thus corresponding to step 335 of method 300). It will be understood that the lookup tables 500 could also be precomputed to instead store the appropriate multiplication ($b_i * c_i \bmod m_i$ or $c_i \bmod m_i$) dependent on the value of d, thereby trading storage efficiency for processing efficiency, because this would increase the size of the lookup tables quadratically.

While the foregoing description enables the computation of $b^d \bmod N$ without actually providing the value of d, and thereby provides some increased security in the whitebox setting, an attacker with access to the lookup tables might still discern the value of the secret exponent, d. Specifically, the attacker that could deduce that for each table that is filled with values of "1" the corresponding bit is d was "0," "1" otherwise, would then be able to determine the value of the secret exponent. As such, various methods for adding to the security of the implementation by obfuscating the lookup tables are provided below.

Figure 8:
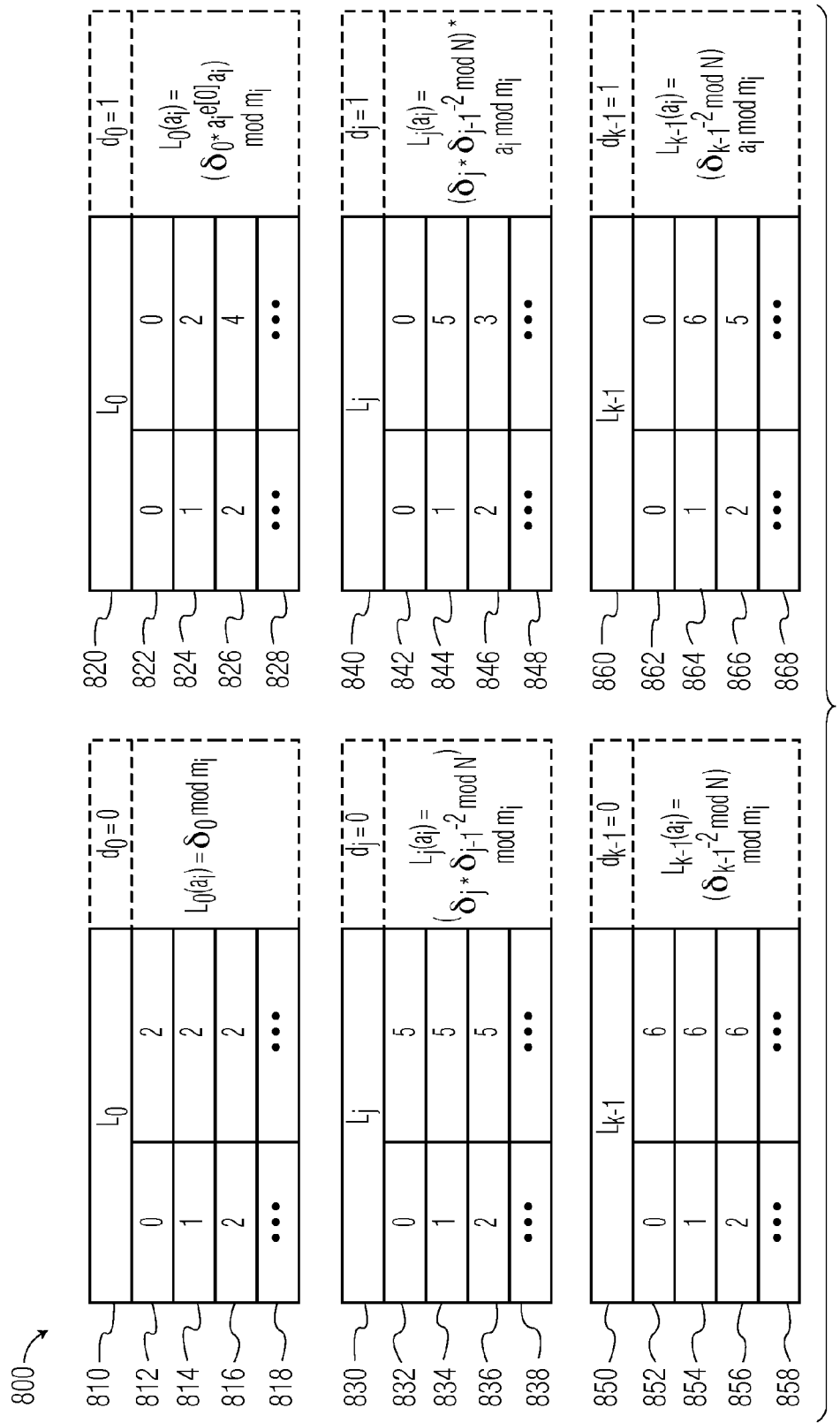
FIG. 8 illustrates a second example of a set of lookup tables for performing conditional multiplication.

FIG. 8 illustrates a second example of a set of lookup tables 800 for performing conditional multiplication.

According to this example, constant values δ are incorporated into the lookup table value through multiplication and subsequently "removed" in later tables using an effective inverse function. It will be understood that operations in addition or alternative to multiplication may be utilized. For example, constant values δ may be added, subtracted, or incorporated in according to any reversible function.

As shown and as previously described with regard to the example of FIG. 5, the table set 800 includes a table for each bit of the secret exponent, d, that is to be considered by the square-and-multiply algorithm. Additionally, the values of the tables may depend on a modulus $m_i$ of the RNS basis $\mathscr{B}_N$. As such, a different set of tables 800 may be provided for each modulus of the RNS basis $\mathscr{B}_N$. While the final table is shown to correspond to the $k-1^{th}$ bit, in various embodiments where the square-and-multiply algorithm does not perform any operation specifically with respect to the $k-1^{th}$ bit, the final table 850, 860 may actually correspond to the $k-2^{th}$ bit. Further, it will also be appreciated in view of the following that, while the square-and-multiply method 300 of FIG. 3 iterates backward from k-2 to 0, the tables as shown are ordered from 0 to k-1 (or k-2). In various embodiments, the tables may be generated in the reverse order such that $L_0$ is the "last" table and $L_{k-1}$ (or $L_{k-2}$) is the "first" table.

As shown, the first table $L_0$ 810, 820 multiplies the value 1 or $a_i$ (depending on the bit value of $d_0$) by a constant corresponding to the first table $\delta_0$ modulo the modulus $m_i$. Thus, when $d_0=0$, table 810 is computed with values determined as $L_j(a^i)=\delta_0 \bmod m_i$. In the specific example shown, the value $\delta_0=2$ was arbitrarily chosen and, as such, the value of each entry is set to "2" (assuming $m_i>2$). When, on the other hand, $d_0=1$, table 820 is provided instead. Here, the values are determined as $L_j(a_i)=\delta_0*a_i \bmod m_i$. As shown, the entries 822, 824, 826 each have different values 0, 2, 4, respectively.

For tables between the first and last table, $L_j$ where $0<j<k-1$, an additional constant $\delta_j$ is incorporated into the table by, for example, multiplying the values by constant $\delta_j$. As before, any reversible function may be used at this step. Additionally, to reverse the effect of the previous table's incorporation of a constant $\delta_{j-1}$, the inverse of that constant is incorporated into the value. Taking into account that, when the $L_j$ table is being considered, the square-and-multiply method 300 will have squared the previous constant $\delta_{j-1}$ through operation of step 325, the inverse for the previous constant $\delta_{j-1}$ when it has been factored into the value is $\delta_{j-1}^{-2} \bmod N$. Thus, intermediate tables 830, 840 simultaneously remove the previous constant incorporate a new constant into the working value by incorporating the term $\delta_j\delta_{j-1}^{-2} \bmod N$ into the values of the table.

Thus, when $d_j=0$, table 830 is computed with values determined as $L_j(a_i)=(\delta_j\delta_j-1-2 \bmod N) \bmod mi$. In the specific example 830 shown, the value of each entry is set to "5" (assuming $m_i>5$). When, on the other hand, $d_j=1$, table 840 is provided instead. Here, the values are determined as $L_j(a_i)=(\delta_j\delta_{j-1}^{-2} \bmod N)*a_i \bmod m_i$. As shown, the entries 842, 844, 846 each have different values 0, 5, 3, respectively.

For the last table, $L_{k-1}$ no additional constants are incorporated into the value and, instead, only the last constant to be incorporated is removed. Thus, when $d_{k-1}=0$, table 850 is computed with values determined as $L_j(a_i)=(\delta_{k-2}^{-2} \bmod N) \bmod m_i$. In the specific example 850 shown, the value of each entry is set to "6" (assuming $m_i>6$). When, on the other hand, $d_j=1$, table 860 is provided instead. Here, the values are determined as $L_j(a_i)=(\delta_{k-2}^{-2} \bmod N)*a_i \bmod m_i$. As shown, the entries 862, 864, 866 each have different values 0, 6, 5, respectively. It will be understood that each of the tables, when actually computed, may include additional entries 818, 828, 838, 848, 858, 868 or fewer entries (e.g., where the corresponding RNS modulus is 2).

Thus, each table (prior to the last) to be applied obfuscates the value by multiplying (or adding, subtracting, etc.) the lookup table value by an arbitrary constant. Further, each table (subsequent to the first) nullifies or the effect of this obfuscation by removing or "canceling out" the arbitrary constant from the lookup table value using a reversal function that takes into account both i) the inverse operation from that used to originally incorporate the value in the previous table, and ii) any interim functions that may have been performed on the working value after the previous table was accessed. In the specific examples shown, the reversal function is the inverse squared because the tables are to be used with a square-and-multiply algorithm. Modifications to enable use of the tables with other algorithms will be apparent.

Figure 9:
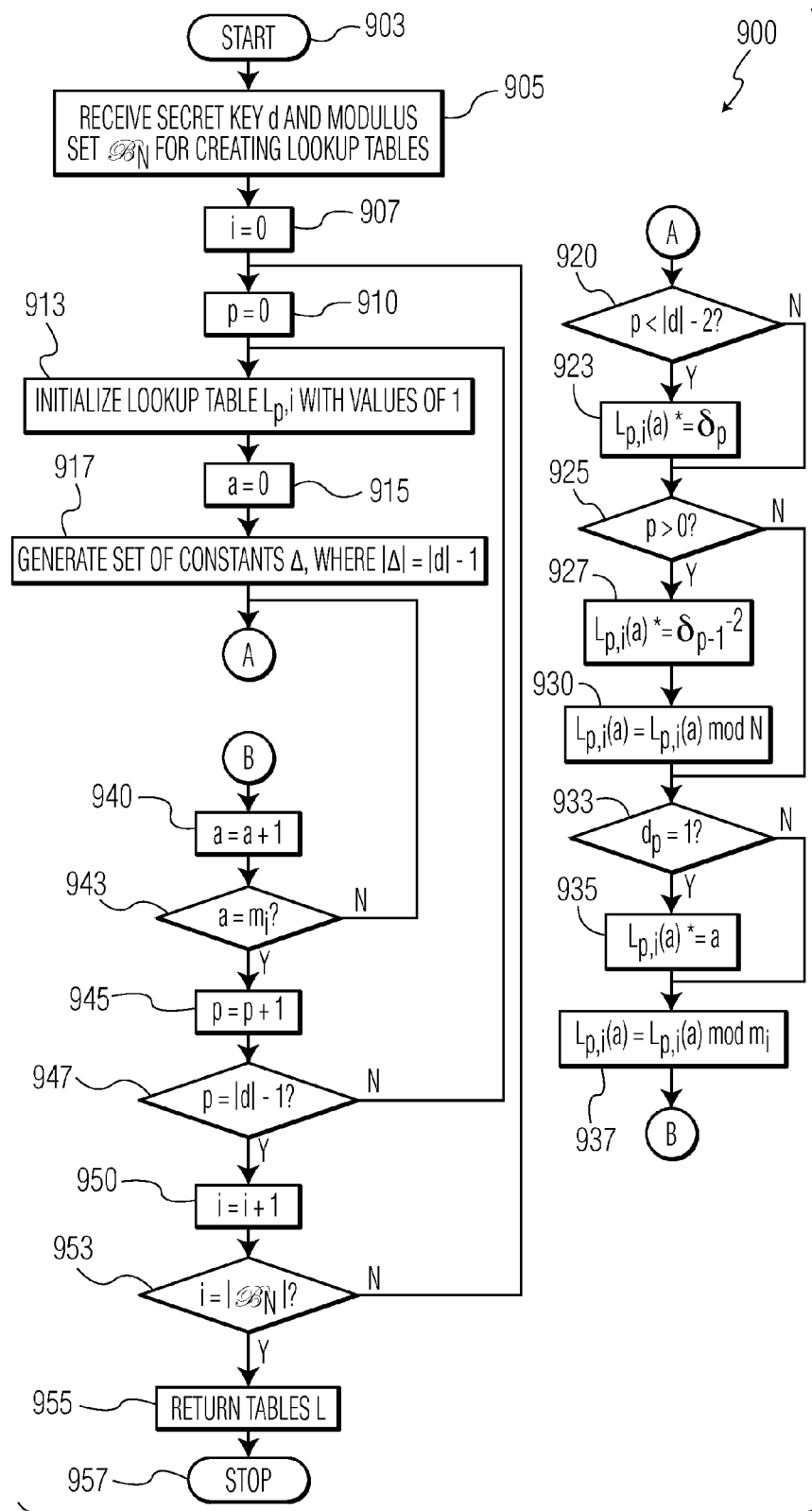
FIG. 9 illustrates an example of a method for generating the second example of a set of lookup tables.

FIG. 9 illustrates an example of a method 900 for generating the second example of a set of lookup tables. The method 900 may be performed by a processor such as, for example, processor 120 executing lookup table generation instructions 173.

The method begins in step 903 and proceeds to step 905 where the processor receives a secret key, d, and set of moduli $\mathscr{B}_N$. The processor then proceeds to initialize a first pass by, in steps 907, 910, 913, and 915, initializing a modulus index i, initializing a bit position index p, initializing a lookup table for the combination of the modulus index and bit position index $L_{p,i}$ to initial values of 1 for each entry, and initializing a table index a. In step 917, the processor generates a set of constants Δ such that Δ contains a constant δ for all but one of the bits of the secret exponent, d. In other words, the number of elements in Δ is equal to the length of d minus one.

Next, the processor generates a value for inclusion in an entry of the table by, in step 920, determining whether the current bit index is less than the length of d minus 2. If so, the current table is not the "last" table and a constant from Δ will be incorporated into the value; in step 923, the processor multiplies the value at $L_{p,i}(a)$ by $\delta_p$. Otherwise, the method skips ahead to step 925.

In step 925, the processor determines whether the current bit index is greater than 0. If so, the current table is not the "first" table and a constant from Δ will be canceled out in the values of the table. In step 927, the processor multiplies the value at $L_{p,i}(a)$ by $\delta_{p-1}^{-2}$ and then, in step 930, modulates the current value in $L_{p,i}(a)$ by N. Otherwise, the method 900 skips ahead to step 933.

In step 933, the processor determines whether the current bit for the secret key, $d_p$, is equal to "1." If so, the processor incorporates the table index a into the value at $L_{p,i}(a)$ at step 933 by multiplying the current value at $L_{p,i}(a)$ by a. Otherwise, the method 900 skips ahead to step 937. Because step 933 is what actually differentiates a table generated based on a "1" bit in d from a table generated based on a "0" bit in d, step 935 may be considered a "differentiating step." At step 937, the processor modulates the value at $L_{p,i}(a)$ by the current modulus $m_i$, thereby completing calculation of the value at $L_{p,i}(a)$.

The processor next increments the table index a in step 940 and determines in step 943 whether all potential table indices a have been processed for table $L_{p,i}$. If a does not yet equal $m_i$, then the method 900 loops back to step 920 where the next entry in table $L_{p,i}$ for the updated a will be computed.

Otherwise, the processor increments the bit index p in step 945 and then determines in step 945 whether additional bits remain in the secret exponent to be processed. If p is not yet equal to the length of d minus 1, the method will loop back to step 913 where the processor will begin creating the next table for the current modulus based on the new bit index.

Once all bits to be assigned a table have been processed, the method proceeds to step 950 where the processor increments the modulus index i and then to step 953 where the processor determines whether additional moduli remain to be processed. If i is not yet equal to the length of the basis set $\mathcal{B}_N$, the method loops back to step 910 where the processor will begin creating a new set of tables for the next modulus mi. Otherwise, the processor returns the generate table sets in step 955 (e.g. distributes the tables to a white box implementation) and the method 900 proceeds to end in step 957.

Use of the tables generated in the method 900 is virtually identical to use of tables generated by method 600. For example, a white box cryptosystem implementation may utilize method 700 to produce modular exponentiations using the tables generated by method 900 with only a minor modification to step 750 to provide that $L_{i,j}$ is accessed. In other words, step 750 is modified to access a lookup table that is associated with the current modulus mi.

While adding an additional level of security, an attacker might still be able to discern the value of d given access to the lookup tables. Specifically, even though the tables associated with a "0" bit are no longer always provided with constant 1 values, as in the first example set 500, those tables that are associated with a "0" bit are input invariant. As can be seen in example tables 810, 830, 850, the output value is always "2," "5," or "6," respectively, while the output of tables 820, 840, 860 vary based on the input. Knowing this, an attacker could work out the bits of the secret exponent d.

Figure 10:
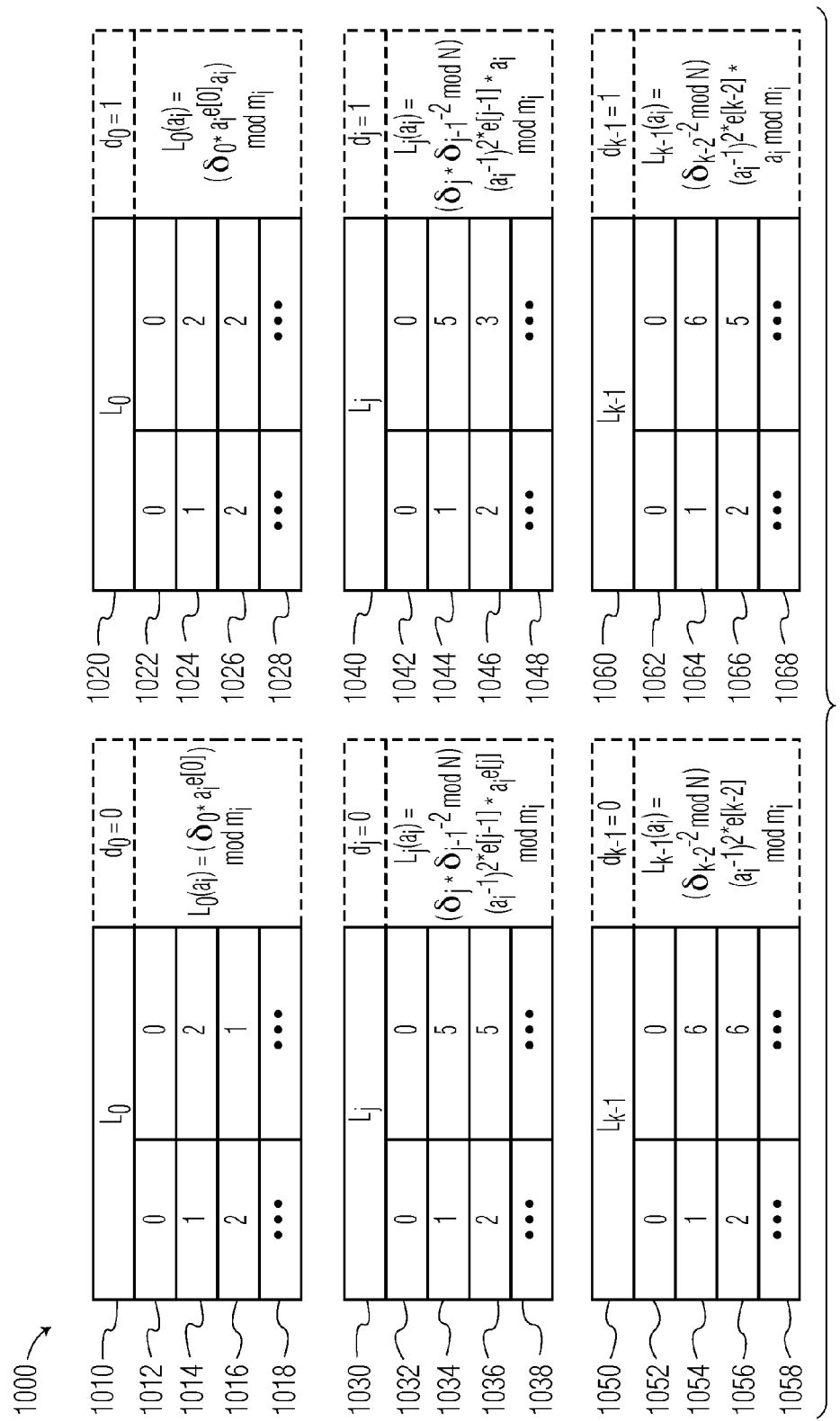
FIG. 10 illustrates a third example of a set of lookup tables for performing conditional multiplication.

FIG. 10 illustrates a third example of a set of lookup tables 1000 for performing conditional multiplication. According to this example, both constant values and an additional power of the input index $a^e$ are incorporated into the lookup table value through multiplication and subsequently "removed" in later tables using an effective inverse function. It will be understood that operations in addition or alternative to multiplication may be utilized. For example, constant values δ may be added, subtracted, or incorporated in according to any reversible function.

As shown and as previously described with regard to the examples of FIGS. 5 and 8, the table set 1000 includes a table for each bit of the secret exponent, d, that is to be considered by the square-and-multiply algorithm. Additionally, the values of the tables may depend on a modulus $m_i$ of the RNS basis $\mathcal{B}_N$. As such, a different set of tables 1000 may be provided for each modulus of the RNS basis $\mathcal{B}_N$. While the final table is shown to correspond to the k-1$^{th}$ bit, in various embodiments where the square-and-multiply algorithm does not perform any operation specifically with respect to the k-1$^{th}$ bit, the final table 1050, 1060 may actually correspond to the k-2$^{th}$ bit. Further, it will also be appreciated in view of the following that, while the square-and-multiply method 300 of FIG. 3 iterates backward from k-2 to 0, the tables as shown are ordered from 0 to k-1 (or k-2). In various embodiments, the tables may be generated in the reverse order such that $L_0$ is the "last" table and $L_{k-1}$ (or $L_{k-2}$) is the "first" table.

As shown, the first table $L_0$ 1010, 1020 multiplies the value 1 or $a_i$ (depending on the bit value of $d_0$) by a constant $\delta_0$ and a power of the input value $a_i^{e[0]}$, corresponding to the table, modulo the modulus $m_i$. Thus, when $d_0=0$, table 1010 is computed with values determined as $L_j(a_i)=(\delta_0 * a_i^{e_0})$ mod $m_i$. In the specific example shown, the value the entries 1012, 1014, 1016 are "0," "2," and "1," respectively (assuming $m_i>2$). When, on the other hand, $d_0=1$, table 820 is provided instead. Here, the values are determined as $L_j(a_i)=(\delta_0 * a_i^{e_0} * a_i)$ mod $m_i$. As shown, the entries 1022, 1024, 1026 each have different values 0, 2, 2, respectively.

For tables between the first and last table, $L_j$ where $0<j<k-1$, an additional constant $\delta_j$ and power of the input $a_i^{e[j]}$ are incorporated into the table by, for example, multiplying the values by constant $\delta_j$ and the power of the input $a_i^{e[j]}$. As before, any reversible function may be used at this step. Additionally, to reverse the effect of the previous table's incorporation of a constant $\delta_{j-1}$ and power $a_i^{e[j-1]}$, the inverse of those values are incorporated into the value. Taking into account that, when the $L_j$ table is being considered, the square-and-multiply method 300 will have squared the previous constant $\delta_{j-1}$ and power $a_i^{e[j-1]}$ through operation of step 325, the inverse for the previous constant $\delta_{j-1}$ and power $a_i^{e[j-1]}$ when they has been factored into the value are $\delta_{j-1}^{-2}$ mod N and $(a_i^{-1})^{2e[j-1]}$. Thus, intermediate tables 1030, 1040 simultaneously remove the previous constant incorporate a new constant into the working value by incorporating the term $(\delta_j \delta_{j-1}^{-2}$ mod $N)*(a_i^{-1})^{2e_{j-1}} * a_i^{e_j}$ into the values of the table.

Thus, when $d_j=0$, table 1030 is computed with values determined as $L_i(a_i)=((\delta_j \delta_{j-1}^{-2}$ mod $N)*(a_i^{-1})^{2e_{j-1}} * a_i^{e_j})$ mod $m_i$. In the specific example 1030 shown, the values of the entries are set to 0, 5, and 5, respectively (assuming $m_i>5$). When, on the other hand, $d_j=1$, table 1040 is provided instead. Here, the values are determined as $L_i(a_i)=((\delta_j \delta_{j-1}^{-2}$ mod N)*ai-12ej-1*aiej*ai mod mi. As shown, the entries 1042, 1044, 1046 each have different values 0, 5, 3, respectively.

For the last table, $L_{k-1}$ no additional constants or powers are incorporated into the value and, instead, only the last constant and power to be incorporated are removed. Thus, when $d_{k-1}=0$, table 1050 is computed with values determined as $L_i(a_i)=(\delta_{k-2}^{-2}$ mod $N)*(a_i^{-1})^{2e_{k-2}})$ mod $m_i$. In the specific example 1050 shown, the values of the entries are set to 0, 6, and 6, respectively (assuming $m_i>6$). When, on the other hand, $d_j=1$, table 1060 is provided instead. Here, the values are determined as $L_i(a_i)=(\delta_{k-2}^{-1}$ mod $N)*(a_i^{-1})^{2e_{k-2}} * a_i)$ mod $m_i$. As shown, the entries 1062, 1064, 1066 each have different values 0, 6, 5, respectively. It will be understood that each of the tables, when actually computed, may include additional entries 1018, 1028, 1038, 1048, 1058, 1068 or fewer entries (e.g., where the corresponding RNS modulus is 2).

Figure 11:
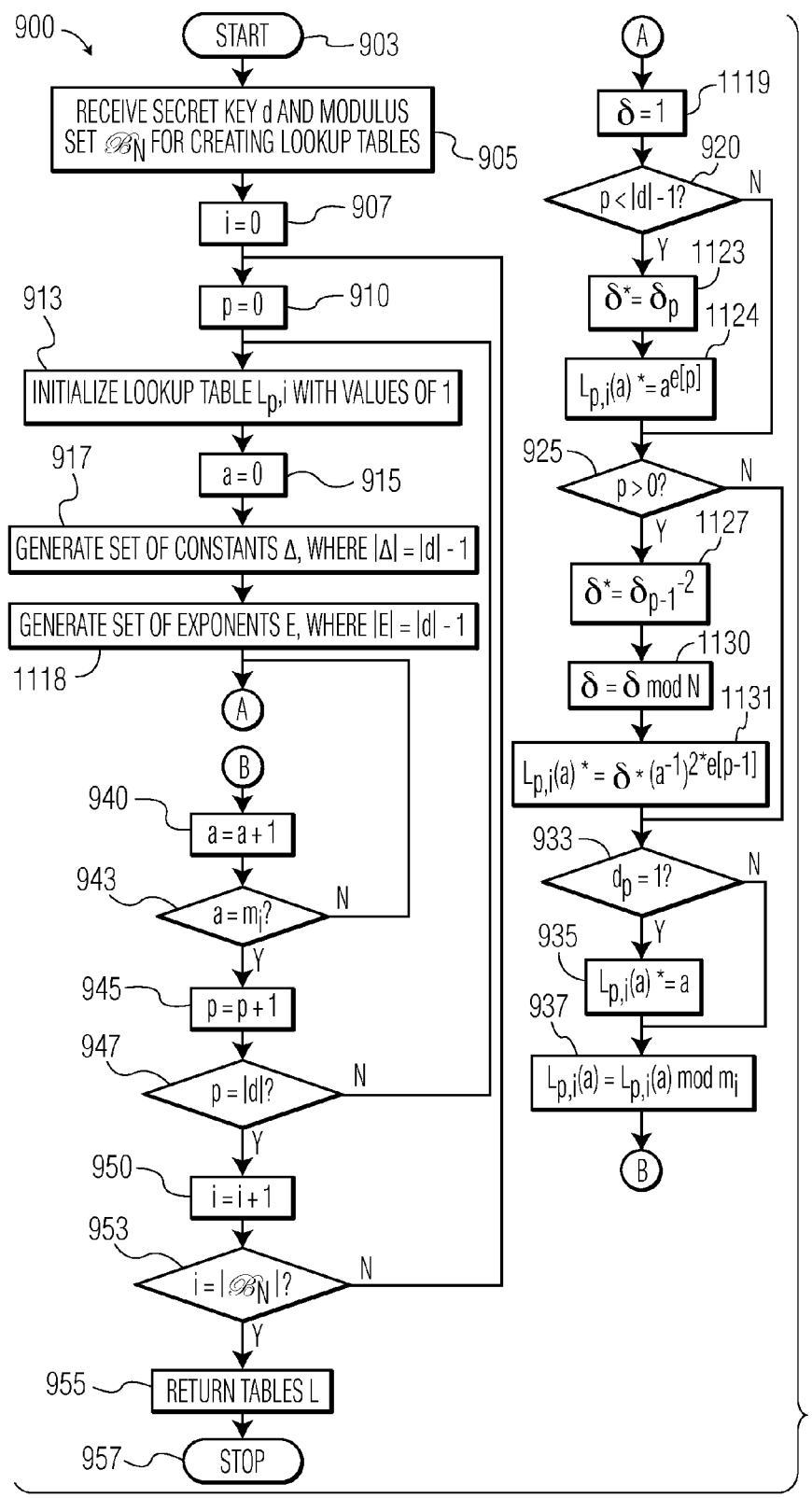
FIG. 11 illustrates an example of a method for generating the third example of a set of lookup tables.

FIG. 11 illustrates an example of a method 1100 for generating the third example of a set of lookup tables. The method 1100 may be performed by a processor such as, for example, processor 120 executing lookup table generation instructions 173.

The method 1100 is mostly similar to the method 900, with the addition of some new steps. Specifically, after generating a set of constants Δ in step 917, the processor generates a set of exponents E such that E contains an exponent e for all but one of the bits of the secret exponent, d. In other words, the number of elements in E is equal to the length of d minus one.

Additionally, the steps 923, 927, 930 of incorporating the constants $\delta_p$ and $\delta_{p-1}$ have been preserved in steps 1123, 1127, 1130 but are now held in a temporary variable δ that is initialized in step 1119. Two additional steps 1124, 1131 are included to incorporate and cancel out powers of the table index, respectively, into the value of the entry. Specifically, step 1124 is executed for all but the last table for each modulus and multiplies the current value of the table entry by a power of a determined by the exponent e in E corresponding to the current bit; in the example here, the processor incorporates the power $a^{e_p}$ into the table entry. Step 1131 cancels the previous power out by incorporating the reverse function (taking into account the effects of the square-and-multiply algorithm or other algorithm into account); in the example here, the processor incorporates the power $(a^{-1})^{2e_{j-1}}$ into the table entry. As will be understood, for a given residue integer $a_i$, the modular inverse $a_i^{-1} = (a^{-1} \mod N) \mod m_i$. Step 1131 also incorporates the temporary constant $\delta$ into the table entry. The result of the modified method 1100 is a set of tables for each modulus $m_i$ that incorporates both obfuscating constants and powers into the values thereof and subsequently cancels out the effects of such obfuscation. For example, as noted above, constants or powers may be incorporated by reversible mathematical functions other than multiplication. For example, a constant $\delta_p$ may be added in to the values in one table, and subtracted out as $\delta_p^2$ in the next table. Further, methods may use a combination of functions for incorporating exponents and powers. For example a table may multiply in the constant $\delta_p$ and add in the power $a^{e_p}$. As another example, a first table may multiply in a constant $\delta_p$ and a subsequent table may add in another constant $\delta_{p-1}$ (while also canceling out the previous constant $\delta_p$). Some implementations may not cancel out each obfuscating term in the immediately following table; instead, the canceling operation may occur two or more tables ahead in the order, taking into account the additional operations performed by the square-and-multiply (or other algorithm). For example, a first table may multiply in a constant $\delta_p$, a second table may multiply by only 1 (e.g. if the corresponding bit in d is "0"), and a third table may cancel the constant $\delta_p$ out by multiplying by $\delta_p^{-4}$ (taking into account the two square operations that will have occurred in the interim). Further, some implementations may not incorporate constants at all and, instead, utilize only powers or another term as an obfuscating factor. It will also be understood that various obfuscating techniques may combined such that different tables use different obfuscating techniques. For example, within a table set, some tables may incorporate constants, others may incorporate powers, while others may not incorporate any obfuscating terms. Various techniques for implementing such alternative embodiments, as well as further modifications, will be apparent.

According to the foregoing, various embodiments enable the efficient computation of modular exponentiations in a white box setting. For example, by providing lookup tables calculated based on the secret exponent corresponding to terms in the modular exponentiation calculation, a white-box implementation may be provided with a method of calculating the modular exponentiation without having access to the secret exponent. Further, through various obfuscation techniques, the value of the secret exponent can be protected from discovery through an analysis of the provided tables. Various additional benefits will be apparent in view of the foregoing.

It should be apparent from the foregoing description that various embodiments of the invention may be implemented in hardware. Furthermore, various embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various embodiments have been described in detail with particular reference to certain aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable medium encoded with instructions for execution by a processor for performing modular exponentiation, the non-transitory machine-readable medium comprising:
   instructions for iteratively calculating a modular exponentiation, $b^d \mod n$, comprising:
   instructions for squaring a working value, c; and
   instructions for conditionally multiplying the working value, c, by a base value, b, dependent on a bit of an exponent, d, comprising:
      instructions for unconditionally multiplying the working value, c, by a lookup table entry associated with the base value.

2. The non-transitory machine-readable medium of claim 1, wherein:
   the working value c, and base value, b, are represented in a residue number system (RNS), and
   the instructions for unconditionally multiplying the working value, c, by a lookup table entry associated with the base value comprises multiplying a plurality of working RNS integers representative of the working value, c, by a plurality of lookup table entries associated with a plurality of base RNS integers representative of the base value, b.

3. The non-transitory machine-readable medium of claim 2, wherein the instructions for multiplying a plurality of working RNS integers representative of the working value, c, by a plurality of lookup table entries associated with a plurality of base RNS integers representative of the base value, b, comprises:
   instructions for multiplying a working RNS integer of the plurality of working RNS integers representative of the working value, c, by a lookup table entry associated with a base RNS integer of the plurality of base RNS integers representative of the base value, b, from a lookup table associated with an RNS modulus corresponding to the base RNS integer.

4. The non-transitory machine-readable medium of claim 1, wherein:
the instructions for iteratively calculating the modular exponentiation comprise instructions for iterating through a plurality of bit positions of the exponent, d, and the instructions for unconditionally multiplying the working value, c, by a lookup table entry associated with the base value, b, comprise instructions for utilizing a lookup table associated with a current bit position from a plurality of lookup tables.

5. The non-transitory machine-readable medium of claim 1, wherein the instructions for conditionally multiplying the working value, c, by a base value, b, dependent on a bit of an exponent, d, comprise instructions for performing a Montgomery multiplication, and
the instructions for performing a Montgomery multiplication invoke the instructions for unconditionally multiplying the working value, c, by a lookup table entry associated with the base value.

6. The non-transitory machine-readable medium of claim 1, further comprising:
instructions for receiving, from another device, a set of lookup tables for use by the instructions for unconditionally multiplying the working value, c, by a lookup table entry associated with the base value.

7. A non-transitory machine-readable medium encoded with instructions for execution by a processor for generating lookup tables for performing modular exponentiation, the non-transitory machine-readable medium comprising:
instructions for initializing a plurality of lookup tables respectively corresponding to different bit positions within a secret exponent, d; and
instructions for generating values for inclusion in the plurality of lookup tables, comprising:
instructions for generating a value for a lookup table according to a first method when the secret exponent, d, carries a first bit value at a bit position associated with the lookup table, and
instructions for generating a value for a lookup table according to a second method different from the first method when the secret exponent, d, carries a second bit value different from the first bit value at a bit position associated with the lookup table.

8. The non-transitory machine-readable medium of claim 7, wherein the instructions for generating values for inclusion in the plurality of lookup tables comprise instructions for obfuscating the generated values.

9. The non-transitory machine-readable medium of claim 8, wherein the instructions for obfuscating the generated values comprise:
instructions for performing a first mathematical function on a first value for inclusion in a first lookup table; and
instructions for performing a second mathematical function on a second value for inclusion in a second lookup table, wherein the second mathematical function is an effective inverse of the first mathematical function.

10. The non-transitory machine-readable medium of claim 9, wherein:
the first mathematical function incorporates an obfuscating value into the first value, and the second mathematical function incorporates the square of a modular inverse of the obfuscating value into the second value.

11. The non-transitory machine-readable medium of claim 10, wherein the obfuscating value comprises a constant value that is invariant based on an index where the first value will be stored within the first lookup table.

12. The non-transitory machine-readable medium of claim 10, wherein the obfuscating value comprises an index where the first value will be stored within the lookup table raised to the power of a constant exponent value.

13. The non-transitory machine-readable medium of claim 7, wherein the first method and the second method share at least one instruction in common.

14. The non-transitory machine-readable medium of claim 7, wherein:
the first method comprises a differentiating instruction for incorporating into the value an index where the value will be stored within the lookup; and
the second method omits the differentiating instruction.

15. The non-transitory machine-readable medium of claim 7, wherein the instructions for initializing a plurality of lookup tables respectively corresponding to different bit positions within a secret exponent, d, comprise:
instructions for determining a set of moduli M to be used in a residue numerical system (RNS); and
instructions for initializing, for each modulus $m_i$, in the set of moduli M, a plurality of lookup tables respectively corresponding to different bit positions within a secret exponent, d.

16. A non-transitory machine-readable medium encoded with instructions for execution by a processor for generating lookup tables for performing modular exponentiation, the non-transitory machine-readable medium comprising:
instructions for initializing a plurality of lookup tables $L_{i,j}$ respectively corresponding to a plurality of pairings of bit positions of a secret exponent, d, and residue number system (RNS) moduli;
instructions for, when the value of the secret exponent, d, at the bit position corresponding to a first lookup table $L_{0,k}$ is 0, setting the values of a first lookup table, $L_{0,k}$, of the plurality of lookup tables as $$L_{0,m_i}(a_i) = (\delta_o * a_i^{e_0}) \bmod m_i$$

where $a_i$, is a potential RNS integer for modulus $m_i$ of the RNS moduli, $\delta_o$ is a first predetermined constant, and $e_0$ is a first predetermined exponent; and
instructions for, when the value of the secret exponent, d, at the bit position corresponding to a first lookup table $L_{0,k}$ is 1, setting the values of a first lookup table, $L_{0,mi}$, of the plurality of lookup tables as $$L_{0,m_i}(a_i) = (\delta_o * a_i^{e_0} * a_i) \bmod m_i.$$

17. The non-transitory machine-readable medium of claim 16, further comprising:
instructions for, when the value of the secret exponent, d, at the bit position corresponding to a last lookup table $L_{k-1,mi}$ is 0, setting the values of a first lookup table, $L_{k-1,mi}$, of the plurality of lookup tables as)

$$L_{k-1,m_i}(a_i) = ((\delta_{k-2}^{-2} \bmod N) * (a_i^{-1})^{2e_{k-2}}) \bmod m_i$$

where $a_i$ is a potential RNS integer for modulus $m_i$ of the RNS moduli, $\delta_{k-2}$ is a last predetermined constant, $e_{k-2}$ is a last predetermined exponent, and N is a modulus for modular exponentiation; and
instructions for, when the value of the secret exponent, d, at the bit position corresponding to a last lookup table $L_{k-1,mi}$ is 0, setting the values of a first lookup table, $L_{k-1,mi}$, of the plurality of lookup tables as $$L_{k-1,m_i}(a_i) = ((\delta_{k-2}^{-2} \bmod N) * (a_i^{-1})^{2e_{k-2}} * a_i) \bmod m_i.$$

18. The non-transitory machine-readable medium of claim 17, further comprising:

instructions for, when the value of the secret exponent, d, at the bit position corresponding to a middle lookup table $L_{j,mi}$ is 0, setting the values of a first lookup table, $L_{j,mi}$, of the plurality of lookup tables as $$L_{j,m_i}(a_i) = ((\delta_{j-1}^{-2} * \delta_j \bmod N) * (a_i^{-1})^{2e_{j-1}} * a_i^{e_j}) \bmod m_i$$

where $a_i$ is a potential RNS integer for modulus $m_i$ of the RNS moduli $m_i$, $\delta_{j-1}$ is a previous predetermined constant with respect to the middle lookup table, $\delta_j$ is a current predetermined constant for the middle lookup table, $e_{j-1}$ is a previous predetermined exponent with respect to the middle lookup table, $e_j$ is a current predetermined exponent for the middle lookup table, and N is a modulus for modular exponentiation; and instructions for, when the value of the secret exponent, d, at the bit position corresponding to a middle lookup table $L_{j,mi}$ is 1, setting the values of a first lookup table, $L_{j,mi}$, of the plurality of lookup tables as $$L_{j,m_i}(a_i) = ((\delta_{j-1}^{-2} * \delta_j \bmod N) * (a_i^{-1})^{2e_{j-1}} * a_i^{e_j} * a_i) \bmod m_i.$$

* * * * *